US009220386B2

(12) United States Patent
Gilbert, Jr. et al.

(10) Patent No.: US 9,220,386 B2
(45) Date of Patent: Dec. 29, 2015

(54) ROBOTIC VACUUM

(75) Inventors: Duane Leigh Gilbert, Jr., Goffstown, NH (US); Faruk Halil Bursal, Lexington, MA (US); Richard Joseph Therrien, Duxbury, MA (US); Russell Walter Morin, Woburn, MA (US)

(73) Assignee: iRobot Corporation, Bedford, MA (US)

( * ) Notice: Subject to any disclaimer, the term of this patent is extended or adjusted under 35 U.S.C. 154(b) by 913 days.

(21) Appl. No.: 13/460,347

(22) Filed: Apr. 30, 2012

(65) Prior Publication Data

US 2012/0311813 A1  Dec. 13, 2012

Related U.S. Application Data

(60) Provisional application No. 61/481,147, filed on Apr. 29, 2011.

(51) Int. Cl.
*A47L 5/10* (2006.01)
*A47L 9/04* (2006.01)
(Continued)

(52) U.S. Cl.
CPC ............... *A47L 9/0477* (2013.01); *A47L 7/02* (2013.01); *A47L 11/24* (2013.01); *A47L 11/4041* (2013.01); *B25J 11/0085* (2013.01); *A47L 2201/06* (2013.01); *Y10S 901/01* (2013.01)

(58) Field of Classification Search
CPC ......... A47L 7/02; A47L 9/0477; A47L 11/24; A47L 11/4041; A47L 2201/06; Y10S 901/01; B25J 11/0085
USPC .......................................................... 15/384
IPC ....................................................... A47L 5/10
See application file for complete search history.

(56) References Cited

U.S. PATENT DOCUMENTS 1,829,548 A    10/1931  Smellie et al.
2,064,856 A    12/1936  Riebel, Jr.
(Continued)

FOREIGN PATENT DOCUMENTS

DE    4400956 C1   10/1994
EP    0051996 A2   5/1982
(Continued)

OTHER PUBLICATIONS

International Search Report for application No. PCT/US2012/035898 dated Nov. 30, 2012.
(Continued)

*Primary Examiner* — David Redding
(74) *Attorney, Agent, or Firm* — Honigman Miller Schwartz and Cohn LLP

(57) ABSTRACT

An autonomous mobile robot comprise: a chassis having a drive system in communication with a control system; a cleaning head assembly having a lower cage and mounted to the chassis; a debris collection bin mounted to the chassis; a vacuum airway having a vacuum inlet and an airway outlet positioned adjacent the debris collection bin, and configured to deliver debris from the cleaning head assembly to a debris collection bin, the vacuum airway extending between the cleaning assembly and debris collection bin and being in fluid communication with an impeller disposed within the debris collection bin; and a cleaning head module connected to the chassis and having a front roller including a front shape-changing resilient tube and an adjacent rear roller including a rear shape-changing resilient tube rotatably opposing therewith beneath the vacuum inlet.

37 Claims, 28 Drawing Sheets

(51) Int. Cl.
   *A47L 11/40*      (2006.01)
   *A47L 11/24*      (2006.01)
   *A47L 7/02*       (2006.01)
   *B25J 11/00*      (2006.01)

(56) References Cited

U.S. PATENT DOCUMENTS

| | | | |
|---|---|---|---|
| 2,578,549 A | 12/1951 | Hooban |
| 2,770,825 A | 11/1956 | Pullen |
| 4,401,909 A | 8/1983 | Gorsek |
| 4,552,505 A | 11/1985 | Gorman |
| 4,679,152 A | 7/1987 | Perdue |
| 4,918,441 A | 4/1990 | Bohman |
| 4,962,453 A | 10/1990 | Pong, Jr. et al. |
| 5,086,535 A | 2/1992 | Grossmeyer et al. |
| 5,109,566 A | 5/1992 | Kobayashi et al. |
| 5,204,814 A | 4/1993 | Noonan et al. |
| 5,216,777 A | 6/1993 | Moro et al. |
| 5,233,682 A | 8/1993 | Abe et al. |
| 5,251,358 A | 10/1993 | Moro et al. |
| 5,284,522 A | 2/1994 | Kobayashi et al. |
| 5,321,614 A | 6/1994 | Ashworth |
| 5,341,540 A | 8/1994 | Soupert et al. |
| 5,365,634 A | 11/1994 | Hughes |
| 5,410,479 A | 4/1995 | Coker |
| 5,507,067 A | 4/1996 | Hoekstra et al. |
| 5,515,572 A | 5/1996 | Hoekstra et al. |
| 5,539,953 A | 7/1996 | Kurz |
| 5,542,146 A | 8/1996 | Hoekstra et al. |
| 5,548,511 A | 8/1996 | Bancroft |
| 5,613,261 A | 3/1997 | Kawakami et al. |
| 5,646,494 A | 7/1997 | Han |
| 5,682,313 A | 10/1997 | Edlund et al. |
| 5,710,506 A | 1/1998 | Broell et al. |
| 5,813,086 A | 9/1998 | Ueno et al. |
| 5,815,884 A | 10/1998 | Imamura et al. |
| 5,867,800 A | 2/1999 | Leif |
| 5,910,700 A | 6/1999 | Crotzer |
| 5,935,179 A | 8/1999 | Kleiner et al. |
| 5,942,869 A | 8/1999 | Katou et al. |
| 5,959,423 A | 9/1999 | Nakanishi et al. |
| 6,055,702 A | 5/2000 | Imamura et al. |
| 6,076,025 A | 6/2000 | Ueno et al. |
| 6,076,227 A | 6/2000 | Schallig et al. |
| 6,091,219 A | 7/2000 | Maruo et al. |
| 6,212,732 B1 | 4/2001 | Tajima et al. |
| 6,220,865 B1 | 4/2001 | Macri et al. |
| 6,278,918 B1 | 8/2001 | Dickson et al. |
| 6,285,930 B1 | 9/2001 | Dickson et al. |
| 6,321,337 B1 | 11/2001 | Reshef et al. |
| 6,323,570 B1 | 11/2001 | Nishimura et al. |
| 6,370,453 B2 | 4/2002 | Sommer |
| 6,385,515 B1 | 5/2002 | Dickson et al. |
| 6,389,329 B1 | 5/2002 | Colens |
| 6,400,048 B1 | 6/2002 | Nishimura et al. |
| 6,437,465 B1 | 8/2002 | Nishimura et al. |
| 6,459,955 B1 | 10/2002 | Bartsch et al. |
| 6,463,368 B1 | 10/2002 | Feiten et al. |
| 6,470,237 B2 | 10/2002 | Fujita et al. |
| 6,490,539 B1 | 12/2002 | Dickson et al. |
| 6,505,341 B1 | 1/2003 | Harris et al. |
| 6,556,892 B2 | 4/2003 | Kuroki et al. |
| 6,574,536 B1 | 6/2003 | Kawagoe et al. |
| 6,584,376 B1 | 6/2003 | Van Kommer |
| 6,671,592 B1 | 12/2003 | Bisset et al. |
| 6,690,134 B1 | 2/2004 | Jones et al. |
| 6,742,220 B2 | 6/2004 | Nagai et al. |
| 6,781,338 B2 | 8/2004 | Jones et al. |
| 6,809,490 B2 | 10/2004 | Jones et al. |
| 6,845,297 B2 | 1/2005 | Allard |
| 6,883,201 B2 | 4/2005 | Jones et al. |
| 7,027,893 B2 | 4/2006 | Perry et al. |
| 7,085,623 B2 | 8/2006 | Siegers |
| 7,159,276 B2 | 1/2007 | Omoto et al. |
| 7,171,723 B2 | 2/2007 | Kobayashi et al. |
| 7,174,238 B1 | 2/2007 | Zweig |
| 7,193,384 B1 | 3/2007 | Norman et al. |
| 7,228,202 B2 | 6/2007 | Carlson et al. |
| 7,283,892 B1 | 10/2007 | Boillot et al. |
| 7,363,108 B2 | 4/2008 | Noda et al. |
| 7,424,611 B2 | 9/2008 | Hino et al. |
| D647,265 S | 10/2011 | Follows et al. |
| 8,316,503 B2 | 11/2012 | Follows et al. |
| 2002/0081937 A1 | 6/2002 | Yamada et al. |
| 2002/0169521 A1 | 11/2002 | Goodman et al. |
| 2004/0020000 A1 | 2/2004 | Jones |
| 2004/0049877 A1 | 3/2004 | Jones et al. |
| 2004/0074028 A1 | 4/2004 | Goff |
| 2004/0098167 A1 | 5/2004 | Yi et al. |
| 2004/0187249 A1 | 9/2004 | Jones et al. |
| 2004/0204792 A1 | 10/2004 | Taylor et al. |
| 2004/0211444 A1 | 10/2004 | Taylor et al. |
| 2004/0216265 A1 | 11/2004 | Peacock et al. |
| 2004/0236468 A1 | 11/2004 | Taylor et al. |
| 2004/0244138 A1 | 12/2004 | Taylor et al. |
| 2005/0181968 A1 | 8/2005 | Policicchio et al. |
| 2005/0183229 A1 | 8/2005 | Uehigashi |
| 2005/0204717 A1 | 9/2005 | Colens |
| 2008/0052846 A1 | 3/2008 | Kapoor et al. |
| 2010/0037418 A1 | 2/2010 | Hussey et al. |
| 2010/0287717 A1 | 11/2010 | Jang et al. |

FOREIGN PATENT DOCUMENTS

| | | |
|---|---|---|
| EP | 1228734 A2 | 8/2002 |
| GB | 2262433 A | 6/1993 |
| GB | 2344863 A | 6/2000 |
| JP | 55104929 U | 4/1982 |
| JP | 05049566 A | 3/1993 |
| JP | 06007271 A | 1/1994 |
| JP | 06014853 A | 1/1994 |
| JP | 08173355 A | 7/1996 |
| JP | 11216084 A | 8/1999 |
| JP | 2000354567 A | 12/2000 |
| JP | 2002112931 A | 4/2002 |
| JP | 2002345698 A | 12/2002 |
| JP | 2003000484 A | 1/2003 |
| JP | 2003290092 A | 10/2003 |
| JP | 2003290093 A | 10/2003 |
| JP | 2004121795 A | 4/2004 |
| JP | 2006034996 A | 2/2006 |
| JP | 2006149455 A | 6/2006 |
| JP | 2006325761 A | 12/2006 |
| JP | 05146382 A | 1/2008 |
| JP | 2008000382 A | 1/2008 |
| JP | 2009017902 A | 1/2009 |
| JP | 2011016011 A | 1/2011 |
| JP | 2011115541 A | 6/2011 |
| KR | 20110125942 A | 11/2011 |
| WO | WO-9516382 A1 | 6/1995 |
| WO | WO-2005107563 A1 | 11/2005 |
| WO | WO-2007065033 A2 | 6/2007 |
| WO | WO-2009117383 A2 | 9/2009 |
| WO | WO-2011121816 A1 | 10/2011 |

OTHER PUBLICATIONS

International Search Report for application No. PCT/US2012/035894 dated Nov. 30, 2012.

FIG. 27A Suspended (carried)
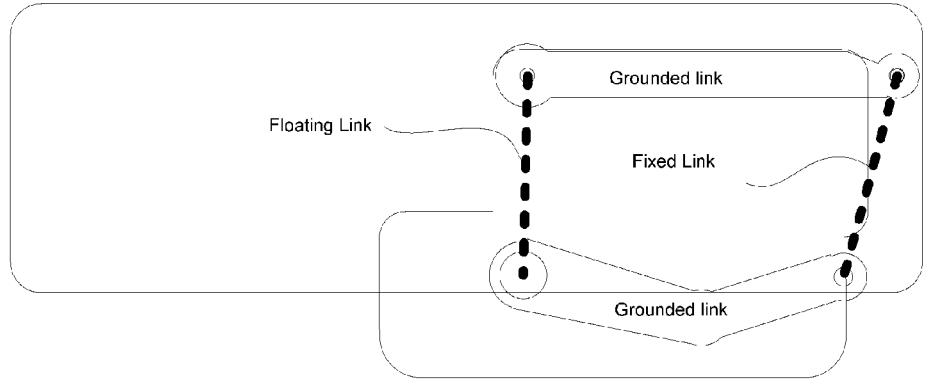
FIG. 27B Level Floor (hard)
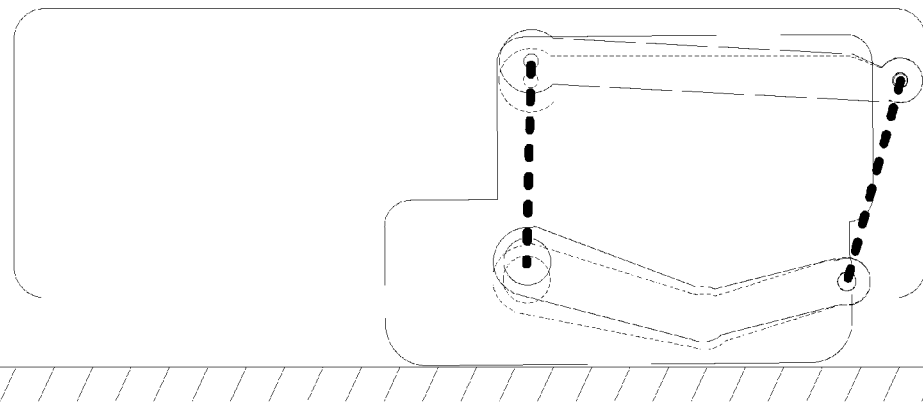
FIG. 27C Transition (carpet)
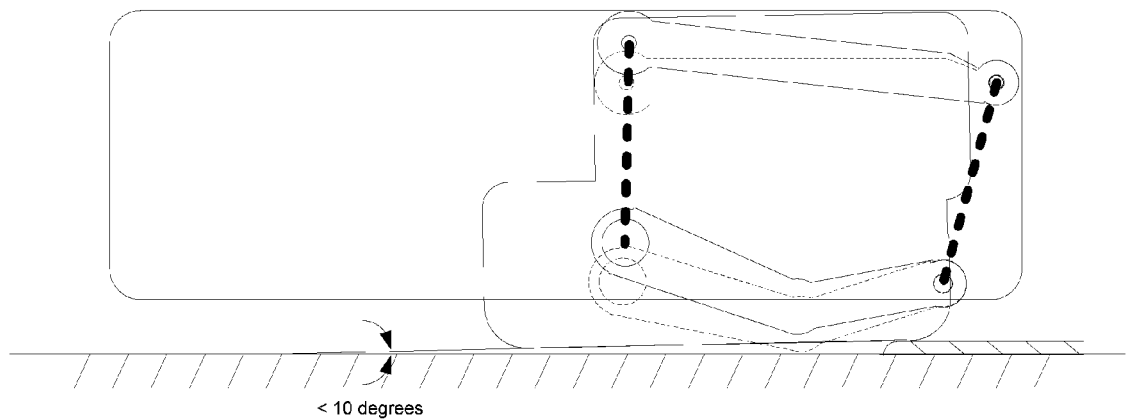
< 10 degrees

ROBOTIC VACUUM

This application claims priority to U.S. Provisional Patent Application No. 61/481,147, filed Apr. 29, 2011, titled Robotic Vacuum, the content of which is incorporated herein by reference in its entirety.

FIELD

The present teachings relate to a cleaning head for a robotic vacuum. The present teachings relate more specifically to a cleaning head for a robotic vacuum having improved cleaning ability.

BACKGROUND

Concerns for robotic vacuum designers and manufacturers include, among other things, maximizing the effectiveness of the cleaning head and increasing the volume of the dust bin, minimizing the overall size of the robotic vacuum and production cost, providing adequate cleaning power, and preventing hair and other debris from interrupting or degrading performance of the robotic vacuum.

A dust bin collects hair, dirt and debris that has been vacuumed and/or swept from a floor. A larger dust bin volume can allow the robotic vacuum to remove more debris from an environment before requiring that the user remove and empty the dust bin, which can increase user satisfaction.

Robotic vacuums typically remove debris from the floor primarily using one or more rotating brushes and/or a vacuum stream that pulls the debris into the cleaning head and generally toward the dust bin.

It is known that hair and similar debris such as string and thread can become entangled, and stall the robotic vacuum and/or degrade cleaning ability.

In many robotic vacuums, impellers can be located in a robotic vacuum dust bin to pull air carrying swept dirt, hair, and debris into the dust bin.

SUMMARY

The present teachings provide an improved cleaning head for a robotic vacuum.

In one implementation, a compressible, resilient roller rotatably engaged with an autonomous coverage robot includes a resilient tubular member having one or more vanes extending outwardly from an outer surface thereon. The resilient tubular member has integrally formed therein a plurality of resilient curvilinear spokes extending between an inner surface of the flexible tubular member and a hub disposed along the longitudinal axis of the tubular member. The hub has one or more engagement elements formed therein for engaging securely with a rigid drive shaft. In one embodiment, engagement elements are a pair of receptacles formed into the circumference of the hub for receiving raised key elements formed along the outer surface of the rigid drive shaft. The engagement elements enable the transfer of torque from the drive shaft to the resilient tubular member via the resilient curvilinear spokes.

In certain embodiments, the curvilinear spokes extend within about 5% to about 50% of the longitudinal length of the flexible tubular member, or more specifically about 10% to about 30% of the longitudinal length of the flexible tubular member, or more specifically about 10% to about 20% of the longitudinal length of the flexible tubular member In one embodiment, the compressible roller further includes a resilient compressible material disposed between the flexible tubular tube and the rigid drive shaft. The resilient compressible material may be, for example, Thermoplastic Polyurethan (TPU) foam, Ethyl Vinyl Acetate (EVA), or polypropylene foam, and in some implementations, the resilient compressible material may be affixed permanently to the rigid shaft to resist shear forces that would otherwise dislodge the resilient compressible material. In one implementation, the curvilinear spokes are serpentine shaped in cross section and therefore automatically spring back to their full extension upon removal of external (e.g., a radial) force. The curvilinear spokes and hub may be located along the entire longitudinal length of the tubular member, but need only occupy a portion of the longitudinal length. For example, in one implementation, the curvilinear spokes and hub may occupy only about 10% to about 20% of the length of the resilient tubular member and may be centered about a central portion of the tubular member along the longitudinal axis of the tubular member, leaving 80% or more of unobstructed length along which compressible resilient material may be disposed.

In one aspect, the one or more vanes are integrally formed with the resilient tubular member and define V-shaped chevrons extending from one end of the resilient tubular member to the other end. In one embodiment, the one or more vanes are equidistantly spaced around the circumference of the resilient tube member. In one embodiment, the vanes are aligned such that the ends of one chevron are coplanar with a central tip of an adjacent chevron. This arrangement provides constant contact between the vanes and a contact surface with which the compressible roller engages. Such uninterrupted contact eliminates noise otherwise created by varying between contact and non-contact conditions. In one implementation, the one or more vanes extend from the outer surface of the tubular roller at an angle $\alpha$ between 30° and 60° relative to a radial axis and inclined toward the direction of rotation (see FIG. 20). In one embodiment the angle $\alpha$ of the vanes is 45° to the radial axis. Angling the vanes in the direction of rotation can reduce stress at the root of the vane, thereby reducing or eliminating the likelihood of a vane tearing away from the resilient tubular member. The one or more vanes contact debris on a cleaning surface and direct the debris in the direction of rotation of the compressible, resilient roller.

In one implementation, the vanes are V-shaped chevrons and the legs of the V are at a 5° to 10° angle $\theta$ relative a linear path traced on the surface of the tubular member and extending from one end of the resilient tubular member to the other end (see FIG. 22). In one embodiment, the two legs of the V-shaped chevron are at an angle $\theta$ of 7°. By limiting the angle $\theta$ to less than 10°, the compressible roller is more easily manufacturable by molding processes. Angles steeper than 10° can create failures in manufacturability for elastomers having a durometer harder than 80 A. In one embodiment, the tubular member and curvilinear spokes and hub are injection molded from a resilient material of a durometer ranging from and including 60 A to 80 A. A softer durometer material than this range may exhibit premature wear and catastrophic rupture and a resilient material of harder durometer will create substantial drag (i.e. resistance to rotation) and will result in fatigue and stress fracture. In one embodiment, the resilient tubular member is manufactured from TPU and the wall of the resilient tubular member has a thickness of about 1 mm. In one embodiment, the inner diameter of the resilient tubular member is about 23 mm and the outer diameter is about 25 mm. In one embodiment of the resilient tubular member having a plurality of vanes, the diameter of the outside circumference swept by the tips of the plurality of vanes is 30 mm.

Because the one or more vanes extend from the outer surface of the resilient tubular member by a height that is, in one embodiment, at least 10% of the diameter of the resilient tubular roller, they can prevent cord-like elements from directly wrapping around the outer surface of the resilient tubular member. The one or more vanes therefore prevent hair or other string-like debris from wrapping tightly around the core of the compressible roller and reducing efficacy of cleaning. Defining the vanes as V-shaped chevrons further assists with directing hair and other debris from the ends of a roller toward the center of the roller, where the point of the V-shaped chevron is located. In one embodiment, the V-shaped chevron point is located directly in line with the center of a vacuum inlet of the autonomous coverage robot.

These structural elements of the compressible roller enable contact with objects passing by the compressible roller into the vacuum airway, while minimizing clearance spaces. Tight clearances (e.g., 1 mm gaps) between the compressible roller and the cleaning head module concentrate the vacuum airflow from the vacuum airway at the cleaning surface, thereby maintaining airflow rate. The compressibility of the roller enables objects larger than those narrow clearance gaps to be directed by the one or more vanes into the vacuum airway. The compressible roller resiliently expands and regains full structural extension once the object passes by the compressible roller into the vacuum airway, thereby removing the contact force.

In accordance with various embodiments of the present teachings, the frame or cage of the cleaning head surrounds the cleaning head and facilitates attachment of the cleaning head to the robotic vacuum chassis. The four-bar linkage discuss hereinabove facilitates movement (i.e., "floating") of the cleaning head within its frame. When a robotic vacuum having a cleaning head in accordance with the present teachings is operating, it is preferable that a bottom surface of the cleaning head remain substantially parallel to the floor, and in some embodiments, it is preferable that the front roller be positioned slightly higher than the rear roller during operation to prevent the front roller from digging into the cleaning surface, especially during transition from a firm surface (e.g., hardwood or tile) to a compressible surface (e.g., carpet). The cleaning head moves vertically during operation, for example to accommodate floor irregularities like thresholds, vents, or moving from a vinyl floor to carpet. The illustrated four-bar linkage provides a simple mechanism to support the cleaning head within the frame and allow the cleaning head to move relative to the frame so that the cleaning head can adjust vertically during operation of the robotic vacuum without pivoting in a manner that will cause the cleaning head to lose its parallel position with respect to the floor.

The frame is intended to remain fixed relative to the robotic vacuum chassis as the cleaning head components illustrated herein move relative to the frame and the chassis.

In another implementation, an autonomous coverage robot has a chassis having forward and rearward portions. A drive system is mounted to the chassis and configured to maneuver the robot over a cleaning surface. A cleaning assembly is mounted on the forward portion of the chassis and at has two counter-rotating rollers mounted therein for retrieving debris from the cleaning surface, the longitudinal axis of the forward roller lying in a first horizontal plane positioned above a second horizontal plane on which the longitudinal axis of the rearward roller lies. The cleaning assembly is movably mounted to the chassis by a linkage affixed at a forward end to the chassis and at a rearward end to the cleaning assembly. When the robot transitions from a firm surface to a compressible surface, the linkage lifts the cleaning assembly from the cleaning surface. The linkage lifts the cleaning assembly substantially parallel to the cleaning surface but such that the front roller lifts at a faster rate than the rearward roller.

The robot has an enclosed dust bin module mounted on the rearward portion of the chassis, and the enclosed dust bin module defines a collection volume in communication with the two counter rotating rollers via a sealed vacuum plenum (which can include an air inlet). The sealed vacuum plenum has a first opening positioned above the two counter-rotating rollers and a second opening positioned adjacent an entry port to the collection volume. The plenum comprises a substantially horizontal elastomeric or hinged portion leading into the collection volume. The substantially horizontal portion flexes or pivots to create a downward slope when the linkage lifts the cleaning assembly to accommodate height differentials in cleaning surfaces. In one embodiment, the substantially horizontal elastomeric portion flexes in a vertical dimension at least 5 mm such that debris lifted from the cleaning surface by the rollers travels up into the plenum and is directed down into the enclosed dust bin.

In certain embodiments, the elastomeric portion flexes in a range of about 1 mm to about 10 mm, or more specifically from about 2 mm to about 8 mm, or more specifically from about 4 mm to about 6 mm (e.g., 5 mm)

In one embodiment, the linkage lifts at a variable rate (the front roller lifting at a faster rate than the rearward roller) such that maximum lift angle from resting state is less than 10°.

The forward roller is positioned higher than the rearward roller such that, on a firm cleaning surface, such as hardwood, the forward roller suspends above the surface and only the rearward roller makes contact. As the robot transitions from a firm cleaning surface to a thick, compressible surface, such as a carpet, the linkage raises the entire cleaning assembly, including the two counter rotating rollers, upward and substantially parallel to the cleaning surface. Additionally, the linkage lifts the front of the cleaning assembly at a faster rate than the rear of the cleaning assembly such that the forward roller lifts faster than the rearward roller. This uneven lift rate accommodates for a transition, for example, between hardwood flooring and carpet while reducing current draw. The current draw would spike if the forward wheel, which rotates in the same direction as the drive wheels of the robot, were to dig into the carpet.

In one embodiment, the cleaning assembly has a cleaning head frame and a roller housing, and the cleaning head frame defines the portion of the chassis to which the roller housing is movably linked. In another implementation, an autonomous mobile robot includes a chassis having a drive system mounted therein in communication with a control system. The chassis has a vacuum airway disposed therethrough for delivering debris from a cleaning assembly mounted to the chassis to a debris collection bin mounted to the chassis. The vacuum airway extends between the cleaning assembly and debris collection bin and is in fluid communication at with an impeller member disposed within the debris collection bin. A cleaning head module connected to the chassis has, rotatably engaged therewith, a front roller and a rear roller positioned adjacent one another and beneath an inlet to the vacuum airway. In one embodiment, the front roller and rear roller are in parallel longitudinal alignment with the inlet. In one implementation both the front roller and rear roller are compressible. In another implementation, one of the front and rear rollers is a compressible roller.

In one implementation, the cleaning head assembly further includes at least two raised prows positioned adjacent the front roller directly above a cleaning surface on which the autonomous mobile robot moves. Each prow is separated from an adjacent prow by a distance equal to or less than the shortest cross sectional dimension within the vacuum airway. Additionally, the maximum distance formable between the front roller and rear roller, at least one of which is compressible, is equal to or shorter than the shortest cross sectional dimension of the vacuum airway. Any debris larger than the shortest cross-sectional airway dimension therefore will be pushed away from the vacuum airway by the at least two prows such that no objects lodge in the vacuum airway. In one implementation, the at least two prows are a plurality of prows distributed evenly across the cleaning head along the length of the front roller. In another aspect, the cleaning head assembly includes a pair of "norkers," or protrusions, disposed substantially horizontally to the cleaning surface and positioned between the cleaning surface and the front and rear rollers. Each of the protrusions extends inward along the non-collapsible ends of the rollers, thereby preventing objects from lodging between the ends of the rollers. For example, the protrusions will prevent electrical cords from migrating between the front roller and rear roller and arresting a drive motor.

In one implementation, a compressible roller rotatably engaged with the cleaning head module includes a resilient tubular member having one or more vanes extending outwardly from an outer surface thereon. The resilient tubular member has integrally formed therein a plurality of resilient curvilinear spokes extending between an inner surface of the flexible tubular member and a hub disposed along the longitudinal axis of the tubular member. The hub has one or more engagement elements formed therein for engaging securely with a rigid drive shaft. In one embodiment, engagement elements are a pair of receptacles formed into the circumference of the hub for receiving raised key elements formed along the outer surface of the rigid drive shaft. The engagement elements enable the transfer of torque from the drive shaft to the resilient tubular member via the resilient curvilinear spokes.

In one embodiment, the compressible roller further includes a resilient compressible material disposed between the flexible tubular member and the rigid drive shaft. The resilient compressible material may be, for example, TPU foam, EVA foam, or polypropylene foam, and in some implementations, the resilient compressible material may be affixed permanently to the rigid shaft to resist shear forces that would otherwise dislodge the resilient compressible material. In other implementations, the resilient compressible material may be affixed permanently to the inner surface of the flexible tubular member to resist shear forces that would otherwise dislodge the resilient compressible material. In one implementation, the curvilinear spokes are serpentine shaped in cross section and therefore automatically spring back to their full extension upon removal of external (e.g. radial) force. The curvilinear spokes and hub may be located along the entire longitudinal length of the tubular member but need only occupy a portion of the longitudinal length. For example, in one implementation, the curvilinear spokes and hub may occupy only about 10% to 20% of the length of the resilient tubular member and may be centered about a central point along the longitudinal axis of the tubular member, leaving 80% or more of unobstructed length along which compressible resilient material may be disposed.

In one aspect, the one or more vanes are integrally formed with the resilient tubular member and define V-shaped chevrons extending from one end of the resilient tubular member to the other end. In one embodiment, the one or more vanes are equidistantly spaced around the circumference of the resilient tubular member. In one embodiment, the vanes are aligned such that the ends of one chevron are coplanar with a central tip of an adjacent chevron. This arrangement provides constant contact between the vanes and a contact surface with which the compressible roller engages. Such uninterrupted contact eliminates noise otherwise created by varying between contact and no contact conditions. In one implementation, the one or more vanes extend from the outer surface of the tubular roller at an angle $\alpha$ between 30° and 60° relative to a radial axis and inclined toward the direction of rotation. In one embodiment the angle $\alpha$ of the vanes is 45° to the radial axis. Angling the vanes in the direction of rotation reduces stress at the root of the vane, thereby reducing or eliminating the likelihood of the vanes tearing away from the resilient tubular member. The one or more vanes contact debris on a cleaning surface and direct the debris in the direction of rotation of the compressible roller.

In one implementation, the vanes are V-shaped chevrons and the legs of the V are at a 5° to 10° angle $\theta$ relative a linear path traced on the surface of the tubular member and extending from one end of the resilient tubular member to the other end. In one embodiment, the two legs of the V-shaped chevron are at an angle $\theta$ of 7°. In one embodiment, the tubular member and curvilinear spokes and hub are injection molded from a resilient material of a durometer in a range of 60 A to 80 A. A soft durometer material than this range may exhibit premature wear and catastrophic rupture and a resilient material of harder durometer will create substantial drag (i.e. resistance to rotation) and will result in fatigue and stress fracture. In one embodiment, the resilient tubular member is manufactured from TPU and the wall of the resilient tubular member has a thickness of about 1 mm. In one embodiment, the inner diameter of the resilient tubular member is about 23 mm and the outer diameter is about 25 mm. In one embodiment of the resilient tubular member having a plurality of vanes, the diameter of the outside circumference swept by the tips of the plurality of vanes is 30 mm.

Because the one or more vanes extend from the outer surface of the resilient tubular member by a height that is, in one embodiment, at least 10% of the diameter of the resilient tubular roller, they prevent cord like elements from directly wrapping around the outer surface of the resilient tubular member. The one or more vanes therefore prevent hair or other string like debris from wrapping tightly around the core of the compressible roller and reducing efficacy of cleaning. Defining the vanes as V-shaped chevrons further assists with directing hair and other debris from the ends of a roller toward the center of the roller, where the point of the V-shaped chevron is located. In one embodiment the V-shaped chevron point is located directly in line with the center of a vacuum inlet of the autonomous coverage robot.

These structural elements of the compressible roller enable contact with objects passing by the compressible roller into the vacuum airway, while minimizing clearance spaces. Tight clearances (e.g., 1 mm gaps) between the compressible roller and the cleaning head module concentrate the vacuum airflow from the vacuum airway at the cleaning surface, thereby maintaining airflow rate. The compressibility of the roller enables objects larger than those narrow clearance gaps to be directed by the one or more vanes into the vacuum airway. The compressible roller resiliently expands and regains full structural extension once the object passes by the compressible roller into the vacuum airway, thereby removing the contact force.

In an embodiment having two compressible rollers, objects twice as large may pass between the two compressible rollers into the vacuum airway, as compared to an embodiment having a single compressible roller. For example, in one embodiment having two collapsible rollers facing one another and each having a plurality of vanes, the outer surfaces of the resilient tubular members are spaced apart by a distance of 7 mm. The vanes on each compressible roller extend a distance of 3 mm from the outer surface of the resilient tubular member, and the vanes on each roller are spaced apart by 1 mm at their closest contact point. In this embodiment, objects as large as 14 mm may compress the compressible rollers on their way to a vacuum plenum that has a shortest dimension of no less than 14 mm. Although the spacing between the outer surfaces of the resilient tubular members is controlled, the gap between the vanes of the compressible rollers will vary because the timing of the position of each of the one or more vanes need not be coordinated.

In certain embodiments, the gap between the rollers is about 7 mm, the vanes come within 1 mm of one another and each vane has a height of about 3 mm. due to the compressibility of the rollers, such an embodiment is configured to allow an item as large as about 14 mm, and for example, items ranging in size from about 7 mm to about 21 mm, to pass between the rollers and into the vacuum inlet and central plenum for deposit within the dust bin. In certain embodiments, the space between the roller can range from 5 mm to 10 mm, or more specifically from 6 mm to 8 mm (e.g., 7 mm). The height of the vanes can range, for example, from 1 mm to 5 mm, or preferably from 2 mm to 4 mm (e.g., 3 mm). The spacing between the vanes of adjacent rollers can range from, for example, ½ mm to 5 mm, or more specifically ½ mm to 2 mm (e.g., 1 mm).

In certain embodiments, the rollers, with vanes, can have a diameter of about 30 mm to 31 mm, and can have diameter of the tube, without vanes, of about 25 mm., in such an embodiment, the central axes of adjacent rollers are about 33 mm apart. The outer diameter of the roller tube without vanes can be, for example, about 15 mm to about 50 mm, or more specifically about 20 mm to about 40 mm, or more specifically about 25 mm to about 30 mm.

In certain embodiments, the collapsible, resilient, shape-changing rollers can co-deform or bend in, such that each roller shape changes to permit debris of greater than ⅓ of the roller diameter to pass between the rollers, or preferably greater than ½ of the roller diameter to pass through the rollers.

In certain embodiments of the present teachings, the height of the vanes makes up less than ⅔ of the full separation between the rollers, and preferably less than ½ of the full separation of the roller, and further preferably more than about 1 cm of the full separation.

In one implementation, a roller rotatably engaged with an autonomous coverage robot includes a resilient tubular member having therein a plurality of resilient curvilinear spokes extending between an inner surface of the flexible tubular member and a hub disposed along the longitudinal axis of the tubular member. The hub has one or more engagement elements formed therein for engaging securely with a rigid drive shaft. In one embodiment, the engagement elements are a pair of receptacles formed into the circumference of the hub for receiving raised key elements formed along the outer surface of the rigid drive shaft. The engagement elements enable the transfer of torque form the drive shaft to the resilient tubular member via the resilient curvilinear spokes.

In one embodiment, the compressible roller further includes a resilient compressible material disposed between the flexible tubular sheet and the rigid drive shaft. The resilient compressible material may be TPU foam, EVA foam, or polypropylene foam, and in some implementations, the resilient compressible material may be affixed permanently to the rigid shaft to resist shear forces that would otherwise dislodge the resilient compressible material. In one implementation, the curvilinear spokes are serpentine shaped in cross section and therefore automatically spring back to their full extension upon removal of external (e.g., radial) force. The curvilinear spokes and hub may be located along the entire longitudinal length of the tubular member but need only occupy a portion of the longitudinal length. For example, in one implementation, the curvilinear spokes and hub may occupy only about 10% to 20% of the length of the resilient tubular member and may be centered about the central point along the longitudinal axis of the tubular member, leaving 80% or more of unobstructed length along which compressible resilient material may be disposed.

In one aspect, the resilient compressible material extends along the length of the drive shaft a from the hub to a location inward from one or both ends of the drive shaft, the resilient tubular member thereby leaving at least one hollow pocket at either or both ends of the roller. In one embodiment, each end of the roller has therein a first hollow pocket and a second hollow pocket. The first hollow pocked is a substantially cylindrical volume bounded by the resilient tubular member and a first guard member (or flange) extending radially outward from the drive shaft at a distance shorter than the inner radius of the resilient tubular member and substantially in parallel alignment with the end of the resilient tubular member. The first guard member therefore is separated from the inner surface of the resilient tubular member by gap large enough to accommodate strands of hair migrating into the hollow pocket. In one implementation, the roller further includes an end cap having one or more concentric walls, or shrouds, inserted into the ends of the resilient tubular member and concentrically aligned with the longitudinal axis of the drive shaft. In one embodiment, the outer shroud member is longer than the inner shroud member. The outer shroud member of the cap fits into, but does not fully occlude the gap between the shroud and the resilient tubular member such that hair migrates into the first hollow pocket. Hair migrating into the first hollow pocket then may migrate further into a second hollow pocket bounded by the inner and outer shroud members, the first guard member a second guard member extending radially from the drive shaft and positioned on the end of the drive shaft in alignment with the end of the inner shroud member.

The first hollow pocket and second hollow pocket collect hair so as to prevent the hair from interfering with rotational drive elements, for example, gears. Once the first and second hollow pockets are filled with hair, additional hair will be rejected and prevented from migrating toward rotational drive elements. The hair collected within the first and second hollow pockets additionally will build up a static charge that repels additional hair attempting to migrate into the roller. Both the drive end and non-driven end of the roller have similarly constructed first and second hollow pockets for collecting hair and preventing interference with rotational elements.

In another implementation, an autonomous mobile robot includes a chassis having a drive system mounted therein in communication with a control system. The chassis has a vacuum airway disposed therethrough for delivering debris from a cleaning head assembly mounted to the chassis to a debris collection bin mounted to the chassis. The vacuum airway extends between the cleaning assembly and debris collection bin and is in fluid communication with an impeller member disposed within the debris collection bin. A cleaning head module connected to the chassis has, rotatably engaged therewith, a tubular front roller and a tubular rear roller positioned adjacent one another and beneath an inlet to the vacuum airway. The longitudinal axis of the front roller lies in a first horizontal plane positioned above a second horizontal plane on which the longitudinal axis of the rear roller lies, and the rear roller extends beneath a lower cage of the cleaning head assembly to make contact with the cleaning surface. The front roller and rear roller are separated by a narrow air gap such that the vacuum draw directed from the vacuum airway is concentrated at a point on a cleaning surface directly beneath the gap. In one embodiment, the narrow gap spans a distance at or between about 1 mm and about 2 mm. In one aspect, the cross sectional area of the gap between the front and rear rollers is substantially equal to or less than the cross sectional area of the vacuum inlet. This further maintains vacuum concentration at the cleaning surface directly beneath the gap between the front and rear rollers. In one embodiment, the ratio of the area of the gap to the area of a planar cross section taken across the vacuum airway inlet positioned above the front and rear rollers is 1:1 and may range to as much as 10:1. In one embodiment, the ratio of the area of the gap to the area of a planar cross section taken across the vacuum airway inlet positioned above the front and rear rollers is 4:1.

Additionally, in some embodiments, a lower surface of the lower cage is positioned above the cleaning surface at a distance no greater than 1 mm, thereby further maintaining a concentrated vacuum beneath the cleaning head assembly, beneath the front roller (which floats above the cleaning surface), and up through the gap between the front and rear rollers.

In one embodiment, the vacuum airway has a substantially constant non-angular cross section from a vacuum inlet positioned above the rollers to an airway outlet positioned adjacent the debris collection bin. In another embodiment, the vacuum inlet flares outward along the longitudinal axis of the front and rear rollers to capture debris entering along the entire length of the rollers. The vacuum inlet is angled toward, and redirects the debris into, the smaller cross sectional volume of the vacuum airway extending from the vacuum inlet. Similarly, the airway outlet may be flared to distribute debris throughout the entire width of the debris collection bin rather than ejecting debris in a single mound directly adjacent the airway outlet. By maintaining a narrower constriction throughout the majority of the vacuum airway and flaring only the vacuum inlet and airway outlet, the airflow velocity is maximized through the vacuum airway, including at a throat, or bend, in the vacuum airway. Maintaining high air velocity throughout the vacuum airway enables debris to pass through the throat of the vacuum airway rather than settling there and obstructing airflow.

In one embodiment, the front roller and the rear roller are in parallel longitudinal alignment with the vacuum airway inlet and both rollers have one or more vanes extending outwardly from an outer surface thereof. In one embodiment, the one or more vanes extend from the outer surface of the roller by a height that is, in one embodiment, at least 10% of the diameter of the resilient tubular roller, and the vanes on the front roller are spaced apart from the vanes on the rear roller by a distance of 1 mm. Maintaining a gap between the vanes allows airflow to pass between the front and rear rollers, and minimizing that gap maintains airflow velocity at the cleaning surface directly beneath and between the front and rear rollers.

The one or more vanes prevent cord-like elements, such as hair or string, from directly wrapping around the outer surface of the roller and reducing efficacy of cleaning. In one embodiment, the one or more vanes are V-shaped chevrons. Defining the vanes as V-shaped chevrons further assists with directing hair and other debris from the ends of the roller toward the center of the roller, where the point of the V-shaped chevron is located. In one embodiment, the V-shaped chevron point is located directly in line with the center of the vacuum airway inlet of the autonomous coverage robot.

In another implementation, an autonomous mobile robot includes a chassis having a drive system mounted therein in communication with a control system. The chassis has a vacuum airway disposed therethrough for delivering debris from a cleaning head assembly mounted to the chassis to a debris collection bin mounted to the chassis. The vacuum airway extends between the cleaning head assembly and debris collection bin and is in fluid communication at with an impeller member disposed within the debris collection bin. A cleaning head module connected to the chassis has rotatably engaged therewith a tubular front roller and a tubular rear roller positioned adjacent one another and beneath an inlet to the vacuum airway. The longitudinal axis of the front roller lies in a first horizontal plane positioned above a second horizontal plane on which the longitudinal axis of the rear roller lies, and the rear roller extends beneath a lower cage of the cleaning head assembly to make contact with the cleaning surface. The front roller and rear roller are separated by an air gap such that the vacuum draw directed from the vacuum airway is concentrated at a point on a cleaning surface directly beneath the air gap. In one embodiment, the air gap spans a distance at or between 1 mm and 2 mm. The cleaning head module envelopes between 125° and 175° of the outer circumference of each roller at a spacing of 1 mm or less between an inner surface of the cleaning head module and the outer surfaces of the front and rear rollers. In one embodiment, the cleaning head module envelopes 150° of the outer circumferential surface of each roller at distance of 1 mm or less. Vacuum airflow is therefore directed substantially between the rollers, and debris lifted by the rollers from the cleaning surface will flow into the vacuum airway through the air gap between the rollers rather than lodging between the rollers the cleaning head module.

Additionally, in some embodiments, a lower surface of the lower cage of the cleaning head is positioned above the cleaning surface at a distance no greater than 1 mm, thereby further maintaining a concentrated vacuum beneath the cleaning head assembly, beneath the front roller (which floats above the cleaning surface), and up through the gap between the front and rear rollers.

In one aspect, the cross-sectional area of the gap between the front and rear rollers is substantially equal to or less than the cross-sectional area of the vacuum inlet. This further maintains vacuum concentration at the cleaning surface directly beneath the gap between the front and rear rollers. In one embodiment, the ratio of the area of the gap to the area of a planar cross section taken across the vacuum airway inlet positioned above the front and rear rollers is 1:1 and may range to as much as 10:1. In one embodiment, the ratio of the area of the gap to the area of a planar cross section taken across the vacuum airway inlet positioned above the front and rear rollers is 4:1.

In one embodiment, the front roller and rear roller are in parallel longitudinal alignment with the vacuum airway inlet and both rollers have one or more vanes extending outwardly from an outer roller surface. In one embodiment, the one or more vanes extend from the outer surface of the roller by a height that is, in one embodiment, at least 10% of the diameter of the resilient tubular roller, and the vanes on the front roller are spaced apart from the vanes on the rear roller by a distance of 1 mm. Maintaining a gap between the vanes allows airflow to pass between the front and rear rollers, and minimizing that gap maintains airflow velocity at the cleaning surface directly beneath and between the front and rear rollers.

In one implementation, the vanes are V-shaped chevrons and the legs of the V are at a 5° to 10° angle θ relative a linear path traced on the surface of each roller and extending from one end of a roller to the other end. The one or more vanes prevent cord-like elements, such as hair or string, from directly wrapping around the outer surface of the roller and reducing efficacy of cleaning. In one embodiment, the one or more vanes are V-shaped chevrons. Defining the vanes as V-shaped chevrons further assists with directing hair and other debris from the ends of the roller toward the center of the roller, where the point of the V-shaped chevron is located. In one embodiment the V-shaped chevron point is located directly in line with the center of the vacuum airway inlet of the autonomous coverage robot.

In another implementation, an autonomous mobile robot includes a chassis having a drive system mounted therein in communication with a control system. The chassis has a vacuum airway disposed therethrough for delivering debris from a cleaning head assembly mounted to the chassis to a debris collection bin mounted to the chassis. The vacuum airway extends between the cleaning head assembly and debris collection bin and is in fluid communication with an impeller member disposed within the debris collection bin. A cleaning head module connected to the chassis has rotatably engaged therewith a tubular front roller and a tubular rear roller positioned adjacent one another and beneath an inlet to the vacuum airway. The longitudinal axis of the front roller lies in a first horizontal plane positioned above a second horizontal plane on which the longitudinal axis of the rear roller lies, and the rear roller extends beneath a lower cage of the cleaning head assembly to make contact with the cleaning surface. The front roller and rear roller are separated by a gap equal to or less than 1 mm such that the vacuum draw directed from the vacuum airway is concentrated at a point on a cleaning surface directly beneath the gap. The cleaning head module envelopes between 125° and 175° of the outer circumference of each roller at a distance of 1 mm or less between an inner surface of the cleaning head module and the outer surfaces of the front and rear rollers. In one embodiment, the cleaning head module envelopes 150° of the outer circumferential surface of each roller at spacing of 1 mm or less. Vacuum airflow is therefore directed substantially between the rollers, and debris lifted by the rollers from the cleaning surface will flow into the vacuum airway through the air gap between the rollers rather than lodging between the rollers the cleaning head module.

Additionally, in some embodiments, a lower surface of the lower cage of the cleaning head is positioned above the cleaning surface at a distance no greater than 1 mm, thereby further maintaining a concentrated vacuum beneath the cleaning head assembly, beneath the front roller (which floats above the cleaning surface), and up through the gap between the front and rear rollers.

In one embodiment, the robot further includes an air filter disposed between the debris collection bin, and an axial intake of the impeller such that the axial intake of the impeller and the longitudinal axis of the air filter are substantially coplanar. Additionally, in embodiments, a removable air filter lid encapsulates the air filter and impeller intake. The volume defined beneath the removable air filter lid and the air filter has a transverse cross-sectional area equal to the cross-sectional area of the impeller intake such that airflow remains continuous and free of airflow contraction and/or constriction throughout the volume and into the debris collection bin.

In one embodiment, the front roller and rear roller are in parallel longitudinal alignment with the vacuum airway inlet and both rollers have one or more vanes extending outwardly from an outer roller surface. In one embodiment, the one or more vanes extend from the outer surface of the roller by a height that is, in one embodiment, at least 10% of the diameter of the resilient tubular roller and the vanes on the front roller are spaced apart from the vanes on the rear roller by a distance of 1 mm. Maintaining a gap between the vanes allows airflow to pass between the front and rear rollers, and minimizing that gap maintains airflow velocity at the cleaning surface directly beneath and between the front and rear rollers.

In one implementation, the vanes are V-shaped chevrons, and the legs of the V are at a 5° to 10° angle θ relative a linear path traced on the surface of each roller, extending from one end of a roller to the other end. The one or more vanes prevent cord-like elements, such as hair or string, from directly wrapping around the outer surface of the roller and reducing efficacy of cleaning. In one embodiment, the one or more vanes are V-shaped chevrons. Defining the vanes as V-shaped chevrons further assists with directing hair and other debris from the ends of the roller toward the center of the roller, where the point of the V-shaped chevron is located. In one embodiment the V-shaped chevron point is located directly in line with the center of the vacuum airway inlet of the autonomous coverage robot.

In another implementation, an autonomous mobile robot includes a chassis having a drive system mounted therein in communication with a control system. The chassis has a vacuum airway disposed therethrough for delivering debris from a cleaning head assembly mounted to the chassis to a debris collection bin mounted to the chassis. The vacuum airway extends between the cleaning head assembly and debris collection bin and is in fluid communication with an impeller member disposed within the debris collection bin. A cleaning head module connected to the chassis has rotatably engaged therewith a tubular front roller and a tubular rear roller positioned adjacent one another and beneath an inlet to the vacuum airway such that a fluid airflow travels upward from a vacuum airway inlet positioned above the rollers through a front portion of the vacuum airway and into a rear portion of the vacuum airway mated to the debris collection bin.

In embodiments, the front portion extending from the vacuum airway (e.g., the vacuum inlet 392 shown in FIG. 3) is sloped such that a top inner surface redirects debris, particularly heavy debris, into the rear portion of the vacuum airway. The longitudinal axis of the front portion is sloped at less than 90° and preferably around 45° relative to a vertical axis.

In embodiments, the front portion extending from the vacuum airway inlet is curved toward the rear portion. The front portion may form a partial parabola for instance, having a variable radius. The apex of the parabola may be located above the rear roller, behind a vertical axis aligned with vacuum inlet. The inner wall of the upper surface of the curved vacuum airway will deflect debris into the rear portion of the vacuum airway.

The front portion and rear portion of the vacuum airway may be formed as a unitary, monolithic component, but in some embodiments the rear portion is an elastomeric member adjoined to a rigid front portion at a sealed joint. In one embodiment, the sealed joined is a compression fit wherein the rigid front portion is inserted into an elastomeric rear portion and affixed by radial compression forces. In another embodiment the sealed joint is an elastomeric overmold. The sealed joint forms a sealed vacuum path that prevents vacuum loses. In embodiments, the rear portion terminates in a flange abutting an opening to the debris collection bin in a sealed configuration. The vacuum airway therefore enables a smooth, sealed vacuum airflow.

In one embodiment, the elastomeric rear portion is manufactured from a thermoplastic material such as Mediprene™ or a thermoplastic vulcanizate (TPV) such as Santoprene™. In one embodiment, the rigid from portion is manufactured from a plastic material such as acrylonitrile butadiene styrene (ABS) or Nylon, which materials have anti-static properties and resist the accumulation of hair.

The longitudinal axis of the front roller lies a first horizontal plane positioned above a second horizontal plane on which the longitudinal axis of the rear roller lies, and the rear roller extends beneath a lower cage of the cleaning head assembly to make contact with the cleaning surface. In some embodiments, a lower surface of the lower cage is positioned above the cleaning surface at a distance no greater than 1 mm, thereby further maintaining a concentrated vacuum beneath the cleaning head assembly, beneath the front roller (which floats above the cleaning surface), and up through the gap between the front and rear rollers.

In one embodiment, the front roller and rear roller are in parallel longitudinal alignment with the vacuum airway inlet and both rollers have one or more vanes extending outwardly from an outer roller surface. In one embodiment, the one or more vanes extend from the outer surface of the roller by a height that is, in one embodiment, at least 10% of the diameter of the resilient tubular roller and the vanes on the front roller are spaced apart from the vanes on the rear roller by a distance of 1 mm. Maintaining a gap between the vanes allows airflow to pass between the front and rear rollers, and minimizing that gap maintains airflow velocity at the cleaning surface directly beneath and between the front and rear rollers.

Objects and advantages of the present teachings will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and, together with the description, serve to explain the principles of the teachings.

BRIEF DESCRIPTION OF THE DRAWINGS

FIGS. 27A to 27C schematically illustrate three positions for an exemplary cleaning assembly suspension in accordance with the present teachings.

DESCRIPTION OF THE EMBODIMENTS

Figure 1:
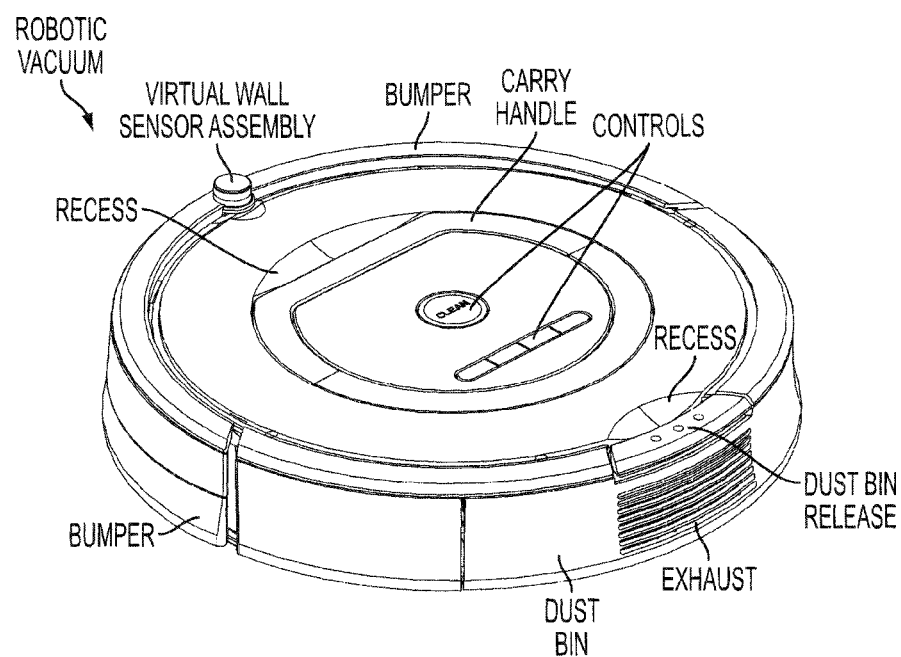
FIG. 1 is a top perspective view of an embodiment of a cleaning robot in accordance with the present teachings.

In accordance with certain embodiments, the present teachings contemplate a cleaning head or cleaning head assembly utilizing at least one, and for example two, rollers having collapsible but resilient cores. Embodiments of the collapsible but resilient roller include an outer tubular surface having vanes extending there from. The outer tubular surface can be supported underneath with a resilient support system including, for example, one or more of a foam material and a flexible spoke. The flexible spokes and foam can be designed to have a curvature, size, and composition suitable to obtain a desired roller flexibility and resiliency. While it may be desirable, in certain embodiments, for the flexibility and resiliency of the roller to be consistent along an entire length of the roller, the present teachings contemplate embodiments wherein the flexibility and resiliency of the roller varying along its length.

In certain embodiments, the foam support can simply be glued to a vane tubular outer tube of the flexible, resilient roller, and can be provided along the entire length of the roller. Alternatively, the roller can be molded to have resilient spokes supporting the tubular tube along the entire length of the roller. In certain embodiments, the tubular tube can be provided by both resilient spokes and foam, for example utilizing resilient spokes in a center portion of the roller and foam at it souter edges, or vice versa. The tubular tube can be keyed to a drive shaft to transfer torque from the drive shaft to the tubular tube to turn the roller appropriately in the cleaning head.

In various embodiments of the present teachings, vanes extending from an outer surface of the tubular tube, from one of the roller to the other end of the roller, can have a generally chevron-type shape. The chevron-type shape can facilitate movement of debris swept by the roller toward a center of the roller (i.e., toward a point of the chevron) so that debris such as hair does not get caught in the ends of the rollers where it can interfere with operation of the roller and thus the cleaning head. To reduce noise caused by interaction of the roller vanes with the floor, the point of one vane chevron can be tangent with the apex of an adjacent vane.

In certain embodiments of the present teachings, a trailing (rear) roller can be set lower that a leading (front) roller. Embodiments of the present teachings can also employ a linkage within the cleaning head attaching the rollers to the cleaning head frame that allows the cleaning head to float the cleaning head leading edge higher than a the cleaning head trailing edge. Keeping the leading roller elevated can prevent the leading roller, which typically rotates in the same direction as the wheels of the robotic vacuum during its forward motion, from digging into carpeting during operation of the vacuum. The trailing roller typically rotates in a the opposite direction from the wheels of the robotic vacuum during its forward motion, and therefore tends to not run the risk of digging into carpeting as it encounters and/or moves across carpeting. The front roller can be aligned, for example, with a bottom portion of the cleanings head, structure, so as to not protrude beyond it.

In certain embodiments of the cleaning head, one collapsible, resilient roller can be aligned parallel to and "face" another roller. The other roller can similarly be collapsible and resilient. "Facing" the other roller can mean that the chevron shapes of the roller vanes mirror each other as the rollers are installed in the cleaning head to be parallel with one another. The present teachings can also pair a resilient collapsible roller as disclosed herein with a conventional robotic vacuum cleaning head roller or brush.

A cleaning head in accordance with certain embodiment of the present teachings can provide a high velocity air system, maximizing air flow velocity by situating the cleaning head rollers close together (with minimal spacing between them) so that the vanes thereon are close together, having an air intake tube of the cleaning head situated directly above the minimal space between the rollers. In addition, a roller frame and a lower housing of the cleaning head can be shaped to minimize the space between the rollers and the portions of the cleaning head housing surrounding the rollers, to again minimize the area of vacuum flow to maximize its speed. The roller frame and a lower housing of the cleaning head should be close enough to the rollers to maximize airflow or obtain a predetermined level of air flow, but should also be spaced from the rollers such that debris does not get wedged therein.

In various embodiments of the present teachings, airflow goes straight up from the rollers into a vacuum inlet having a surface that can act as a deflecting surface (e.g., it is angled or curved) to bounce denser/heavier debris swept upward by the rollers toward a plenum that leads to the dust bin. Bouncing denser debris toward the plenum and dust bin is better facilitated by an angled vacuum inlet, and such bouncing can assist the vacuum in moving denser/heavier debris to the dust bin. In certain embodiments of the present teachings, the vacuum inlet can have a parabolic shape or a constant radius of curvature, although a parabolic shape is preferred. The vacuum inlet need not have a constant radius. The vacuum inlet can be shaped to help guide larger debris toward the center of the plenum, where the air velocity is highest. The vacuum inlet directs air into the plenum and can comprises a more rigid material for better wear resistance and to better bounce debris toward the dust bin. In embodiments of the teachings employing a floating cleaning head, the plenum can comprise a more flexible material that allows the cleaning head to float. Various embodiments contemplate that the junction of the vacuum inlet and the plenum is overmolded to provide a smooth surface over which incoming air flows.

In certain embodiments of the present teachings, during operation with the removable dust bin properly installed, airflow from the cleaning head through to the vacuum impeller is substantially sealed to prevent leaks from lowering vacuum strength. Various embodiments of the present teachings employ a sealed filter within the removable dust bin. The filter is located along the path of the air flow between the cleaning head and the vacuum impeller to prevent dust from migrating to the impeller. The filter is preferably removable but sealed when installed to prevent airflow leakage. Certain embodiments of the present teachings include a "filter presence" indicator tab within a filter cavity. The filter presence indicator tab can prevent operation of the vacuum when the filter is not properly installed, for example by preventing a filter access door from closing such that the removable dust bin cannot be installed in the robotic vacuum.

A robotic vacuum having a cleaning head and dust bin in accordance with the present teachings has improved fluid dynamics due to one or more of the following: impeller design, impeller enclosure design, minimizing turns in the air path from the rollers to the vacuum impeller, minimizing the length of the path from the rollers to the vacuum impeller, minimizing any eddy-producing protrusions along the path from the rollers to the vacuum impeller. The improved fluid dynamics can, for example, allow a lower-powered vacuum impeller (drawing less battery power) to provide a suitable amount of airflow for the robotic vacuum.

In certain embodiments, air flow velocity can additionally or alternatively be maximized by maintaining a substantially constant cross sectional area of air flow across the filter and into the impeller.

Reference will now be made in detail to embodiments of the present teachings, examples of which are illustrated in the accompanying drawings. The cleaning head rollers/brushes disclosed and illustrated herein may include, for example, brushes as disclosed in U.S. patent application Ser. No. 13/028,996, filed Feb. 16, 2011, titled Vacuum Brush, the disclosure of which is incorporated by reference herein in its entirety.

As used herein, "climb rotation" shall mean a rotation of a roller that opposes the direction of forward movement of the robot, i.e., that is opposite to the rotation of the drive wheels as the robot moves in a forward direction. "Roll rotation" shall mean the opposite direction, i.e., a rotation of the roller that is in the same direction as the rotation of the drive wheels in a forward direction. Such rotation need not be at the same speed as the drive wheels, and the directional description is for reference purposes, i.e., a roller may rotate in "climb rotation" even if the robot is stationary or moves backward. "Tube", as used herein, means "covering tube" and need not have a terminal or sealed end. "Linkage" has its ordinary meaning, and is considered to encompass planar linkages, four-bar linkages, slider-crank linkages, and arrangements of link members with pivots, springs, wires, strings, cords, cams, and/or grooves.

FIG. 1 is a top perspective view of an embodiment of a cleaning robot in accordance with the present teachings.

Figure 2A:
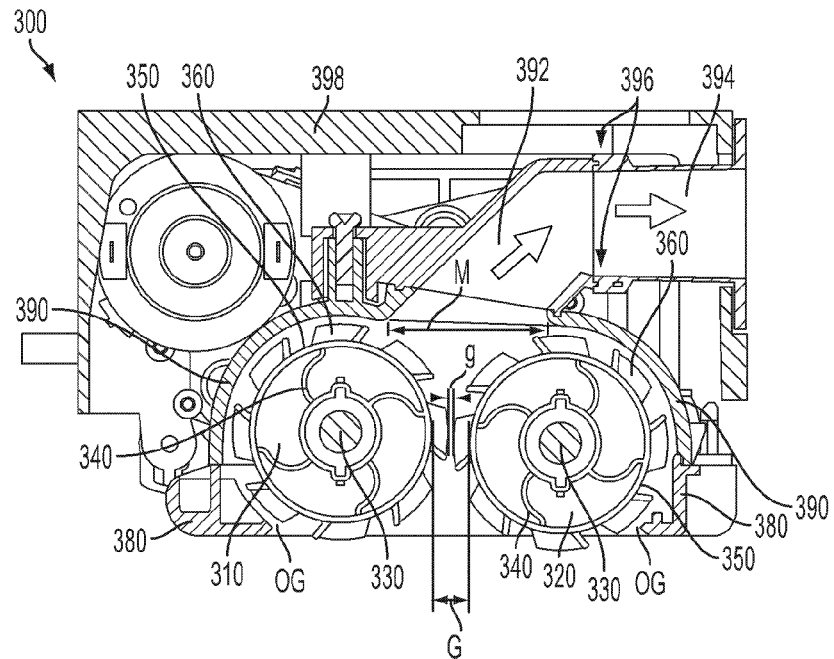
FIG. 2A is a cross sectional view of an exemplary embodiment of a robotic vacuum cleaning head in accordance with the present teachings.
Figure 2B:
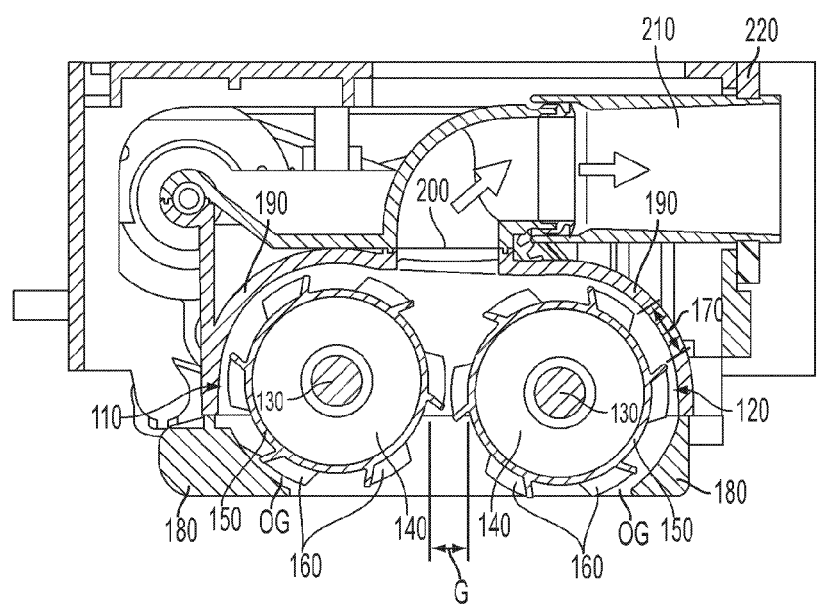
FIG. 2B is a cross sectional view of another exemplary embodiment of a robotic vacuum cleaning head in accordance with the present teachings.

FIGS. 2A and 2B are cross sectional views of different embodiments of a similar portion of a robotic vacuum, each depicting an embodiment of a cleaning head 300, 100 in accordance with the present teachings. In general, the following description shall describe common features of different embodiments; as well as pairs of matching features within one embodiment, using reference numerals separated by a comma.

With respect to both embodiments, the cleaning head includes a front roller 310, 110 and a rear roller 320, 120, each roller having an axle 330, 130 that is preferably substantially rigid and not collapsible and a collapsible, resilient core 340, 140 surrounding the axle 330, 130. The collapsible, resilient core 340, 140 can comprise, for example, a foam material, or other resilient material such as curvilinear spokes, discussed in further detail below. "Collapsible roller" as used herein means a roller with a substantially contiguous tubular outer surface. Upon material external pressure, the tubular outer surface bends or deforms, and upon relief of such pressure, resiliently returns to its former shape, like a balloon, ball, or "run-flat" tire.

The rollers 310, 320, 110, 120 preferably have a circular cross section. The collapsible, resilient core 340, 140 can be surrounded by a tube 350,150 having chevron vanes 360, 160. In accordance with certain embodiments of the present teachings, the chevron vanes 360, 160 are chevron-shaped and, for example, spaced at equal intervals 170 around the tube 350, 150, although the present teachings contemplate a variety of vane spacing intervals and shapes. The chevron vanes 360, 160 may be arranged as 5, 6, 7, 8, or 9 regularly spaced chevron vanes, and are integral with the collapsible tube 350, 150 (preferably injection molded as a complete part) and deform together with the collapsible tube 350, 150. In certain embodiments of the present teachings, the height H (see FIG. 2) of the chevron vanes 360, 160 can be selected to bridge a preselected amount of a gap G between the front roller 310, 110 and the rear roller 320, 120, for example at least about half of the gap G between the front roller 310, 110 and the rear roller 320, 120. In an exemplary embodiment of the present teachings, the gap G between the front roller 310, 110 and the rear roller 320, 120 is about 7 mm, and the height H of the vanes 360, 160 is about 3 mm, making the gap g between the vanes 360, 160 about 1 mm.

A roller frame 380, 180 and the lower housing 390, 190 of the cleaning head 300, 100, can be shaped to complement the outer shape of rollers 310, 320, 110, 120 such that the roller frame 380, 180 and lower housing 390, 190 are close enough to the rollers to maximize airflow in the gap G between the rollers 310, 320, 110, 120, but should also be spaced from the rollers such that debris does not get wedged therein. Proximity of the roller frame 380, 180 and the lower housing 390, 190 to the rollers 310, 320, 110, 120 resists air from being pulled from an outboard gap OG, so that the vacuum pull will be stronger within the gap G between the rollers 310, 320, 110, 120. In certain embodiments of the present teachings, the clearance between the chevron vanes 360, 160 (or other outermost portion of the rollers 310, 320, 110, 120) and the surrounding portions of the roller frame 380, 180 and the lower housing 390,190 can be about 1 mm.

In various embodiments of the present teachings, air can be pulled through the air gap G between the front roller 310, 110 and the rear roller 320, 120, for example by an impeller housed within or adjacent to the cleaning head. The impeller can pull air into the cleaning head from the environment below the cleaning head, and the resulting vacuum suction can assist the rollers 310, 320, 110, 120 in pulling dirt and debris from the environment below the cleaning head 300, 100 into a dust bin of the robotic vacuum. In the illustrated embodiment of FIGS. 2A and 2B, the vacuum impeller pulls air (airflow being indicated by the arrows) through a vacuum inlet 392, 200 to a central plenum 394, 210 that can extend between the vacuum inlet 392, 200 and the dust bin (not shown in FIG. 1).

Figure 3:
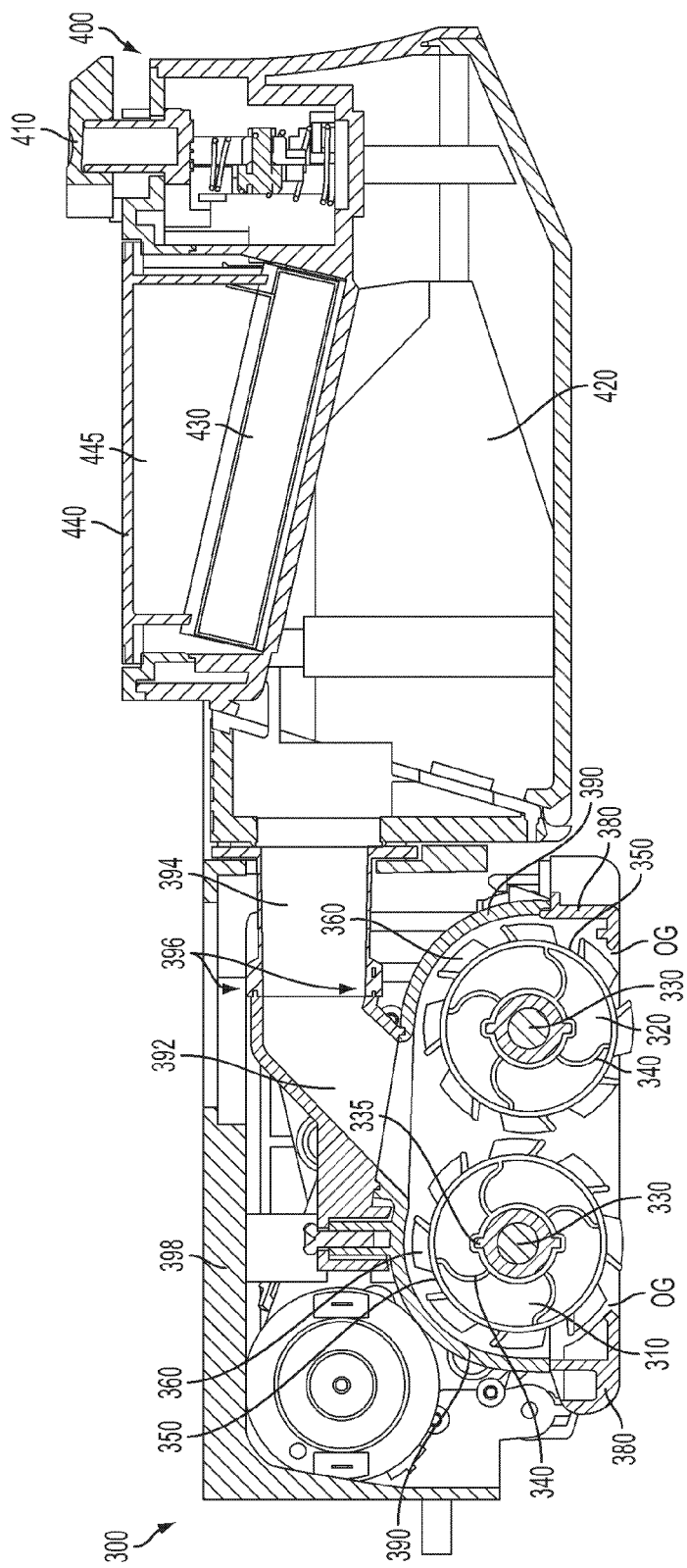
FIG. 3 is a cross sectional view of the embodiment of a cleaning head depicted in FIG. 2A, in combination with a corresponding removable dust bin.

FIG. 3 is a cross sectional view of, with reference to the embodiment of FIG. 2A, a portion of a robotic vacuum having an embodiment of a cleaning head 300 and an embodiment of a removable dust bin 400 in accordance with the present teachings. Air can be pulled through the air gap between the front roller 310 and the rear roller 320, for example by a vacuum impeller housed within or adjacent to the cleaning head 300. The impeller can pull air into the cleaning head from the environment below the cleaning head, and the resulting vacuum suction can assist the rollers 310, 320 in pulling dirt and debris from the environment below the cleaning head 300 into the dust bin 400 of the robotic vacuum. In the illustrated embodiment of FIG. 3, the vacuum impeller (shown in FIGS. 26, 30, and 32) is housed within the dust bin and pulls air through a vacuum inlet 392 to a central plenum 394 that can extend between the vacuum inlet 392 and the dust bin 400. In the illustrated embodiment, the vacuum inlet 392 has an angled surface that can act as a deflecting surface such that debris swept upward by the rollers and pulled upward by the vacuum suction can strike the angled wall of the vacuum inlet 392 and bounce toward the central plenum 394 and the dust bin 400. Bouncing denser debris toward the central plenum 394 and dust bin 400 is better facilitated by an angled vacuum inlet, for example having an angle of inclination with respect to the horizontal of from about 30° to about 60°. The vacuum inlet 392 directs air into the central plenum 394. The vacuum inlet 392 can comprise a more rigid material for better wear resistance and to better bounce debris toward the dust bin 400. In embodiments of the teachings employing a floating cleaning head 300, the central plenum 394 can comprise a more flexible material that allows the cleaning head 300 to "float" with respect to cleaning head frame 398 and the dust bin 400. In such a case, the central plenum 394 is made of an elastomer approximately half the thickness or thinner than the relatively rigid plastic of the introductory plenum 392. Various embodiments contemplate that the junction of the vacuum inlet 392 and the central plenum 394 is overmolded or otherwise smoothed at joint 396 to provide a smooth surface over which incoming air flows.

In certain embodiment of the present teachings, a seal (not shown) can be provided to reduce friction, provide wear resistance, and serve as a face seal between the cleaning head 300 and the dust bin 400. Seals within the cleaning head and the dust bin may be subject to a combination of rotation and translation forces along their surfaces as the cleaning head moves up and down within the robotic vacuum chassis. In such cases, sealed surfaces may be forced or biased toward one another with mechanical engagements that accommodate such rotation and translation (such as, e.g., elastomer to elastomer butt joints and/or interlocking joints).

The illustrated exemplary removable dust bin 400 includes a release mechanism 410 that can be, for example, spring-loaded, a cavity 420 for debris collection, a removable filter 430, and a filter door 440 that, in the illustrated embodiment, provides an air flow cavity 445 that allows air to flow from the filter to a vacuum impeller housed within the dust bin. The cavity 420 has a collection volume. The exemplary dust bin is described in greater detail below.

Figure 4:
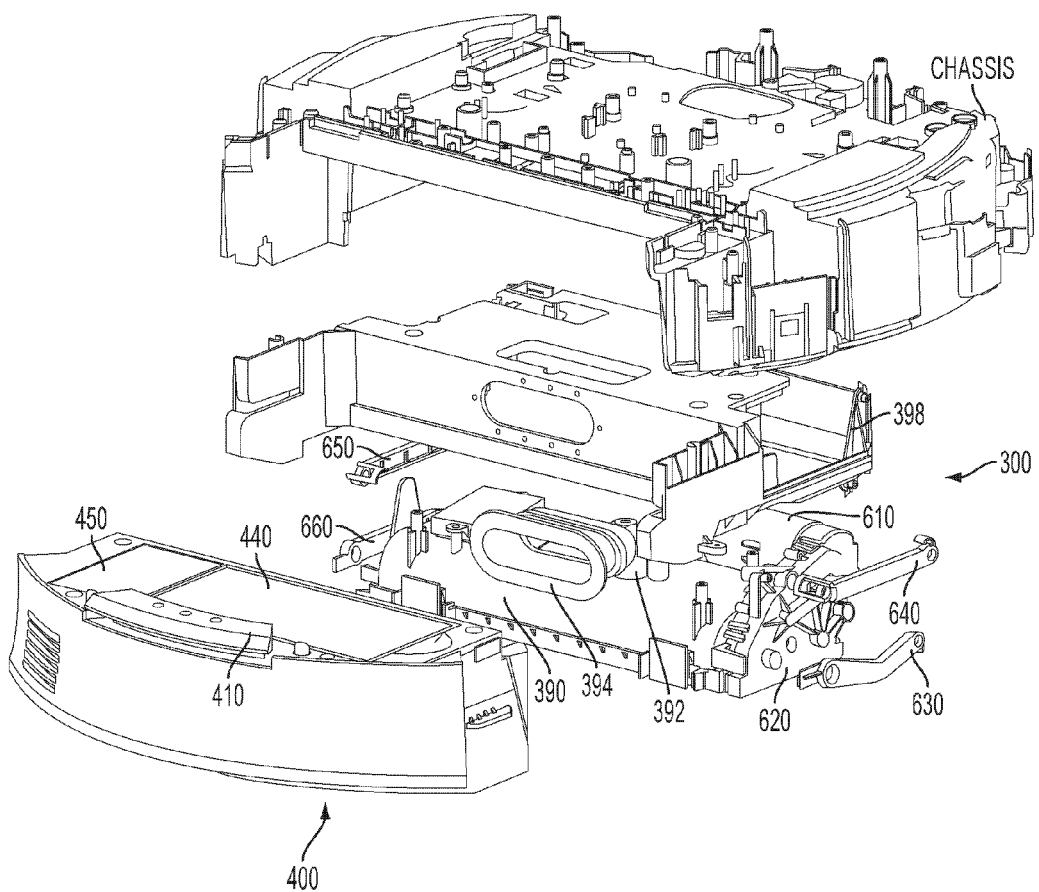
FIG. 4 is an exploded rear perspective view of the cleaning head and dust bin embodiment of FIGS. 2A and 3.

FIG. 4 is an exploded rear perspective view of the cleaning head 300 and the dust bin 400 embodiments of FIG. 3. As shown, the dust bin 400 includes a release mechanism 410 and a filter door 440. In certain embodiments, the vacuum impeller would be housed within the dust bin under the portion 450 depicted in FIG. 5. Indeed, the portion 450 of FIG. 5 can be a removable panel allowing access to the vacuum impeller. A chassis lies above the cleaning head frame 398. Within the cleaning head 300, a roller motor 610 is illustrated at a front of the cleaning head 300, and a gear box 620 is shown that performs gear reduction so that the roller motor 610 can drive the rollers that are positioned under the roller housing 390. The central plenum 394 and vacuum inlet 392 are also shown. As shown in FIG. 4, the exhaust vent for exhaust air exiting the bin is directed through a series of parallel slats angled upward, so as to direct airflow away from the floor. This prevents exhaust air from blowing dust and fluff on the floor as the robot passes.

The cleaning head 300 is supported by a 'four bar linkage', 'slider-crank linkage', or equivalent mechanism permitting the front of the cleaning head 300 to move upward at a slightly faster rate than the rear. The very front of the cleaning head 300, integral with the floating link, is synthesized to lift at a higher rate than the very rear (e.g., 100% to 120% rate). Alternatively, the cleaning head 300, integral with the floating link is synthesized to lift to start with a small angle lift (e.g., 0% to 5%) and end with a higher angle lift (e.g., 1% to 10%). Alternatively, the cleaning head 300, integral with the floating link, is synthesized to translate upwards by a fixed amount and to simultaneously, or later in the synthesis, rotate up by a small angle (0% to 10%). Synthesis of the linkage through three positions or two positions, function generation, path generation, or motion generation, as is known in the art, determines the links' lengths and pivot locations.

Most depictions of the cleaning head 300, 100 in the present description show the cleaning head 300, 100 in a suspended position, e.g., in a position where gravity would pull the cleaning head 300, 100 when the robot is lifted, or alternatively, the full downward extension permitted by the linkage stops within the chassis assembly as the robot chassis moves over various terrain. The three positions schematically shown in FIGS. 27A to 27C show a suspended position; a hard floor operating position, and a position as the robot and cleaning head encounter a carpet or rug.

A first link 630 and a second link 640 (grounded links) of a four-bar linkage are shown on a right side of the FIG. 4 depiction of the cleaning head 300, and are substantially similar to the two linkages 530, 560 of the four-bar linkage of FIG. 5 (described below). The cleaning head forms a floating link between the joints connecting the two grounded links 630, 640, and the chassis supports the fixed link. The links 630, 640 extend adjacent to the roller gearbox 620 and connect to roller gearbox 620 to the frame 398 so that the roller gearbox 620 (and thus the rollers connected thereto) can "float" with respect to the frame 398. Another second link 650 of a second, parallel four-bar linkage is shown on the opposite side of the cleaning head 300. Another first link 660 of the second, parallel four-bar linkage can also be seen located under the second link 650. The links 640, 650, and 660 are substantially straight. The first link 630 of the illustrated four-bar linkage has a bent, somewhat shallow V-shape.

Figure 5:
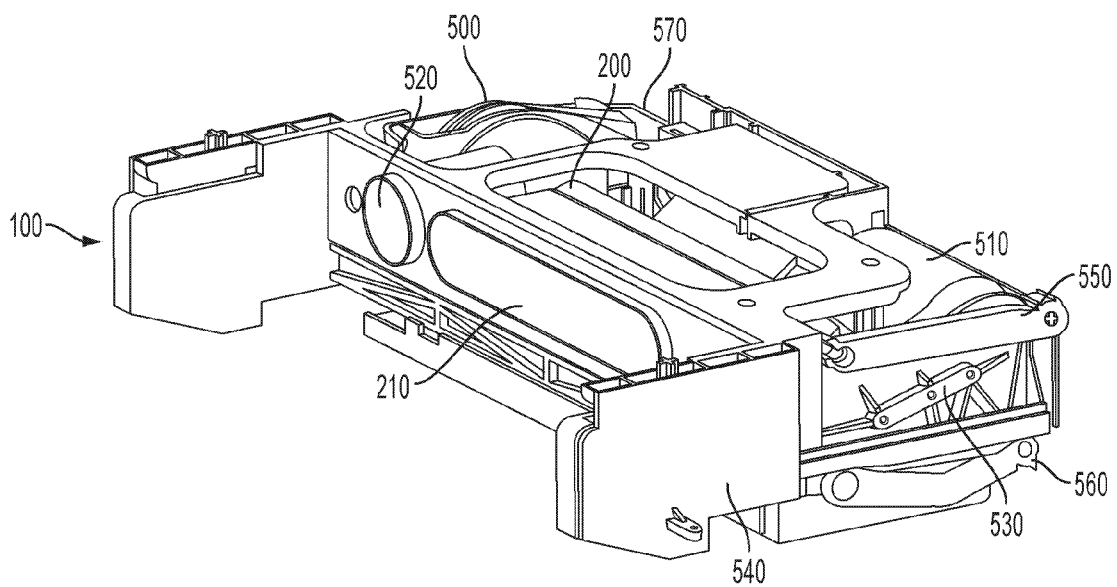
FIG. 5 is a side rear perspective view of the cleaning head and dust bin embodiment of FIG. 2B.

FIG. 5 is a front perspective view of the second embodiment of a cleaning head in accordance with the present teachings, such as the cleaning head illustrated in FIG. 2B. In this configuration, the impeller is positioned within the robot body rather than within the cleaning bin, and vacuum airflow is drawn through the bin via vacuum inlet 200. In FIG. 5, a central plenum 210 and vacuum inlet 200 can be seen, as well as an air input 520 to a vacuum impeller 500. The vacuum impeller 500, a motor 510, and a roller gearbox 530 can also be seen in FIG. 5. In contrast to the first embodiment described with reference to FIG. 4, the second (grounded) link 570 of the far-side (in FIG. 5) four-bar linkage comprises an exemplary L-shaped wire connecting the cage 540 to an impeller housing, which is illustrated in more detail below. A wire is used as the second link 570 to provide more room in the cleaning head 100 for the impeller 500, in embodiments of the present teachings accommodating the vacuum impeller within the cleaning head. Advantages of housing the impeller within the cleaning head can include facilitating a larger dust bin cavity and allowing the same motor to power the impeller and the rollers.

Figure 6:
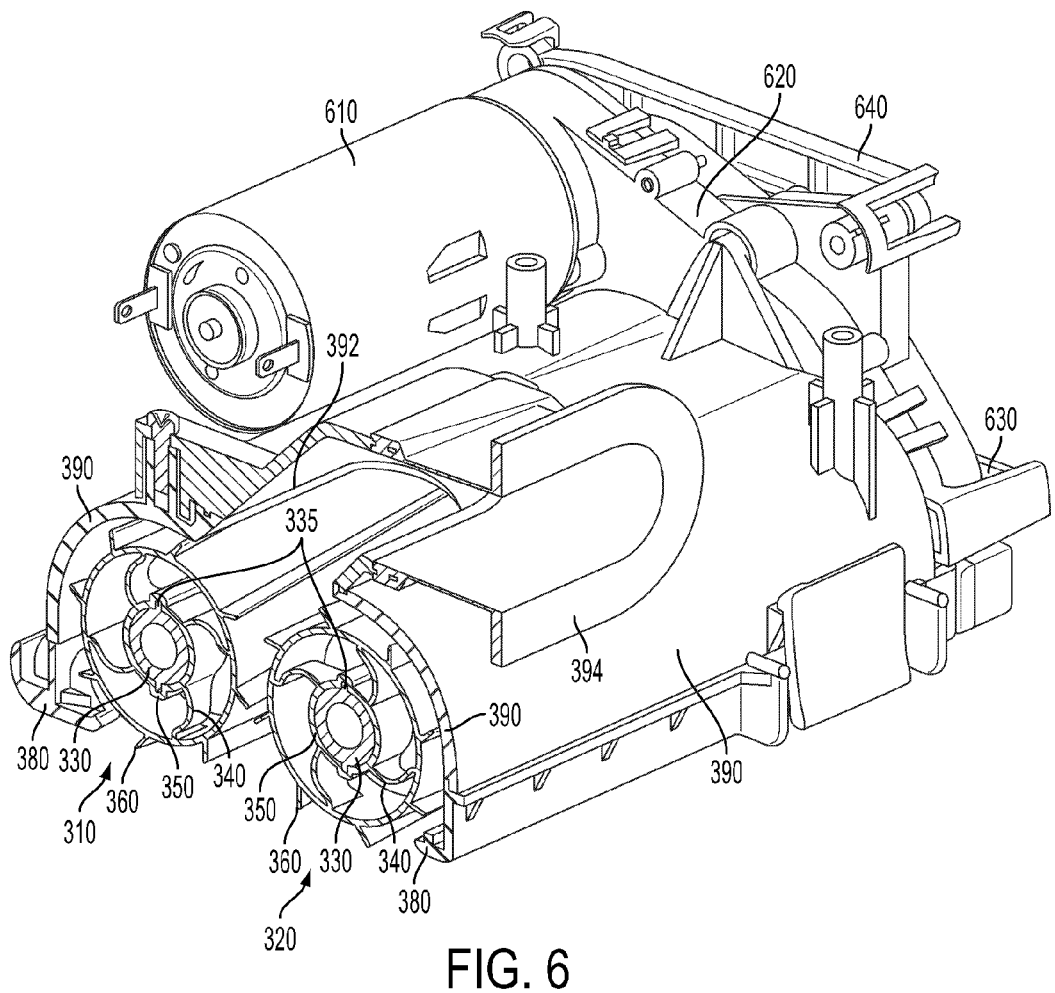
FIG. 6 is a partial side perspective cross-sectional view of the cleaning head embodiment of FIGS. 2A, 3, and 4.

FIG. 6 is a partial side perspective cross-sectional view of the cleaning head embodiment of FIGS. 2A and 4. The relationship of the front roller 310, rear roller 320, vacuum inlet 392, central plenum 394, roller motor 610, and roller gearbox 620 can be seen. The roller motor 610 drives both the front roller 310 and the rear roller 320 via the gear box 620 in a known manner. In certain embodiments of the present teachings, the roller motor 610 rotates the front roller 310 in a roll rotation direction to sweep debris from the floor at an angle toward the rear roller 320, and the roller motor 610 rotates the rear roller 320 in a climb rotation direction to catch the debris launched by the front roller 310 (and other debris) and sweep that debris further upward at an angle toward the vacuum inlet and the suction provided by a vacuum impeller. The debris can bounce off of the rigid, angled surface of the vacuum inlet 392 through the central plenum 394 and into the dust bin 400. The illustrated roller axles 330 are preferably not collapsible and are capable of transferring torque, via key features 335, from the gearbox 620 through to the rollers 310, 320. The illustrated axles 330 can be solid or hollow, and can be keyed at 335 to facilitate rotating torque transfer to the rollers 310, 320. Also shown are curved spokes 340 to provide collapsible but resilient support to the roller tube 350.

Another embodiment of a cleaning head drive system, complementary to the cleaning head arrangement of FIGS. 2B and 5, is illustrated in FIGS. 7, 8, 9, 10A, and 10B. The illustrated exemplary drive system can be used with the cleaning head of FIG. 5, and in contrast to the embodiment of FIGS. 2A, 4, and 6, includes a motor 510 that can drive both a vacuum impeller and two cleaning head rollers. A vacuum impeller, such as impeller 500 shown in FIG. 4, can be driven by an output shaft 700, a front roller (e.g., front roller 110 in FIG. 1) can be driven by a front roller drive shaft 710, and a rear roller (e.g., rear roller 120 in FIG. 1) can be driven by a rear roller drive shaft 720. A cleaning head gear box of 730 contains gears that allow the motor, having a given rotational speed sufficient to drive a vacuum impeller, to drive the front roller at a desired rotational speed in a roll rotation direction and the rear roller at a desired rotational speed in a climb rotation direction.

Figure 7:
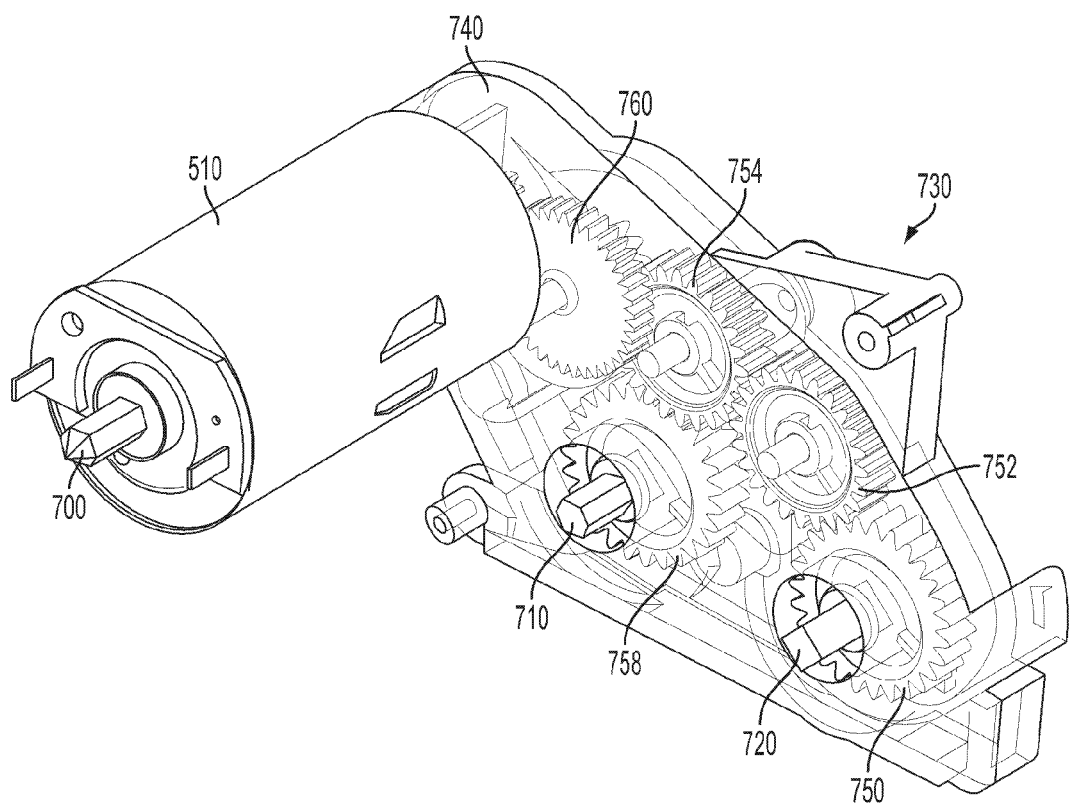
FIG. 7 is a side perspective view of an exemplary motor and cleaning head gear box for the cleaning head shown in FIG. 2B.

The illustrated exemplary cleaning head gear box 730 includes a gearbox housing 740 being illustrated as transparent so that the gears can be seen. In the illustrated embodiment, roller drive shafts 720, 710 are shown extending from a first gear 750 and a fourth gear 758, the roller drive shafts 710, 720 being used to drive the front and rear cleaning head rollers 110, 110, respectively. FIG. 7 also shows the motor output shaft 700 for connection to a vacuum impeller drive shaft (see FIG. 8), the motor output shaft 700 extending directly from a first end of the motor 510. Another output shaft of the motor 510 extends from an opposite end of the motor into the cleaning head gearbox 730 to drive the rollers.

The rotational velocity of the front roller and the rear roller can be different than the rotational velocity of the motor output, and can be different than the rotational velocity of the impeller. The rotational velocity of the impeller can be different than the rotational velocity of the motor. In use, the rotational velocity of the front and rear rollers, the motor, and the impeller can remain substantially constant.

Figure 8:
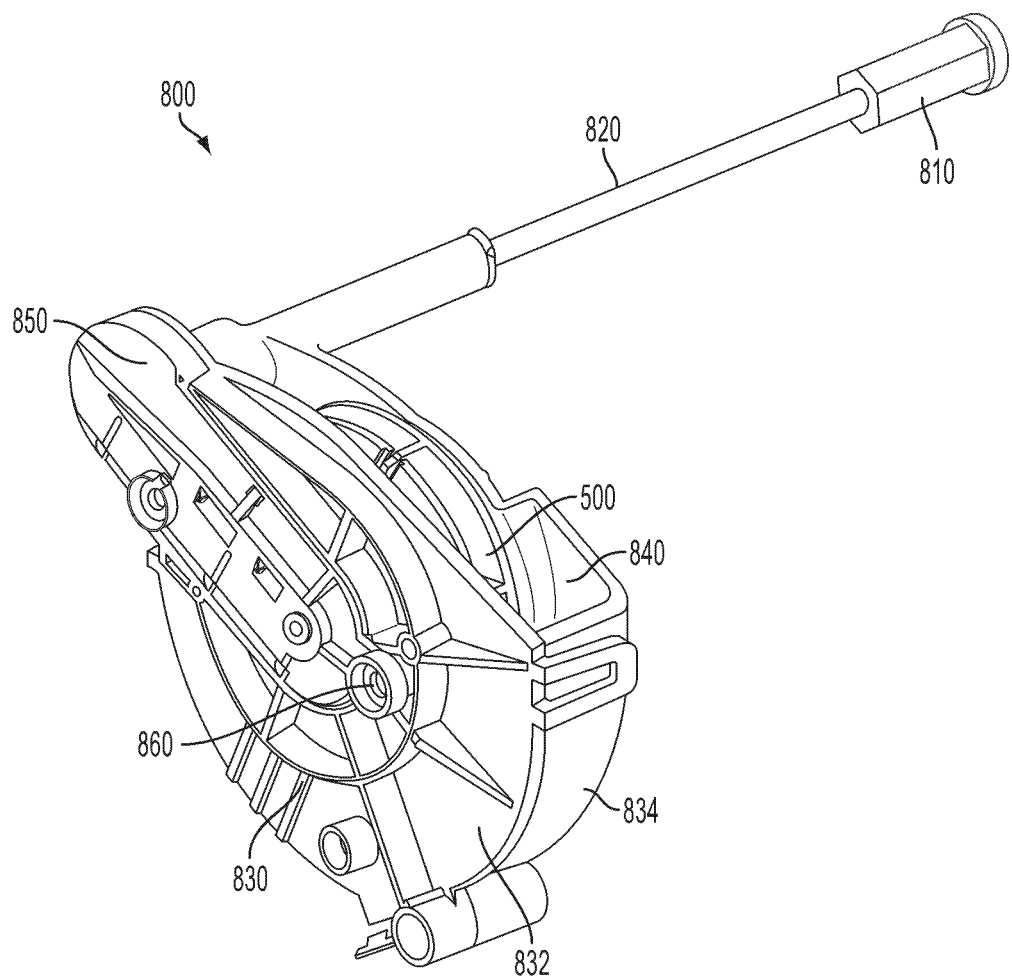
FIG. 8 is a side perspective view of an embodiment of an impeller assembly in accordance with the present teachings, for use in a cleaning head such as that shown in FIG. 2B.

FIG. 8 is a side perspective view of an exemplary embodiment of a vacuum impeller assembly 800 in accordance with the present teachings, to be used together with the assembly of FIG. 7. The illustrated impeller assembly 800 can be used in a cleaning head such as the cleaning head 100 shown in FIG. 4. The assembly 800 includes an impeller 500, a coupler 810 that can be coupled to the motor output shaft 700 shown in FIG. 7, an impeller drive shaft 820, an impeller housing 830 including an outer portion 832 and an inner portion 834, the inner portion 834 of the impeller housing 830 including an air outlet 840 that directs air exiting the impeller 500 back into the environment. A gearbox cover 850 is shown to run along the outer portion of the impeller housing 830, the gearbox cover protecting gears (not shown) that provide a gear reduction from the drive shaft 820 to the impeller 500.

In certain embodiments of the impeller assembly 800, the drive shaft 820 is a 2 mm steel shaft and bushings support the drive shaft on either end. In various embodiments, ribs on the impeller housing 830 can stiffen the housing to prevent deformation under loading and to limit vibration for sound reduction. The illustrated impeller housing 830 includes a connection point 860 for the link 570 shown in FIG. 5, such that the link 570 can connect the impeller housing 830 to the cage 540 to facilitate "floating" of the rollers within the chassis.

Figure 9:
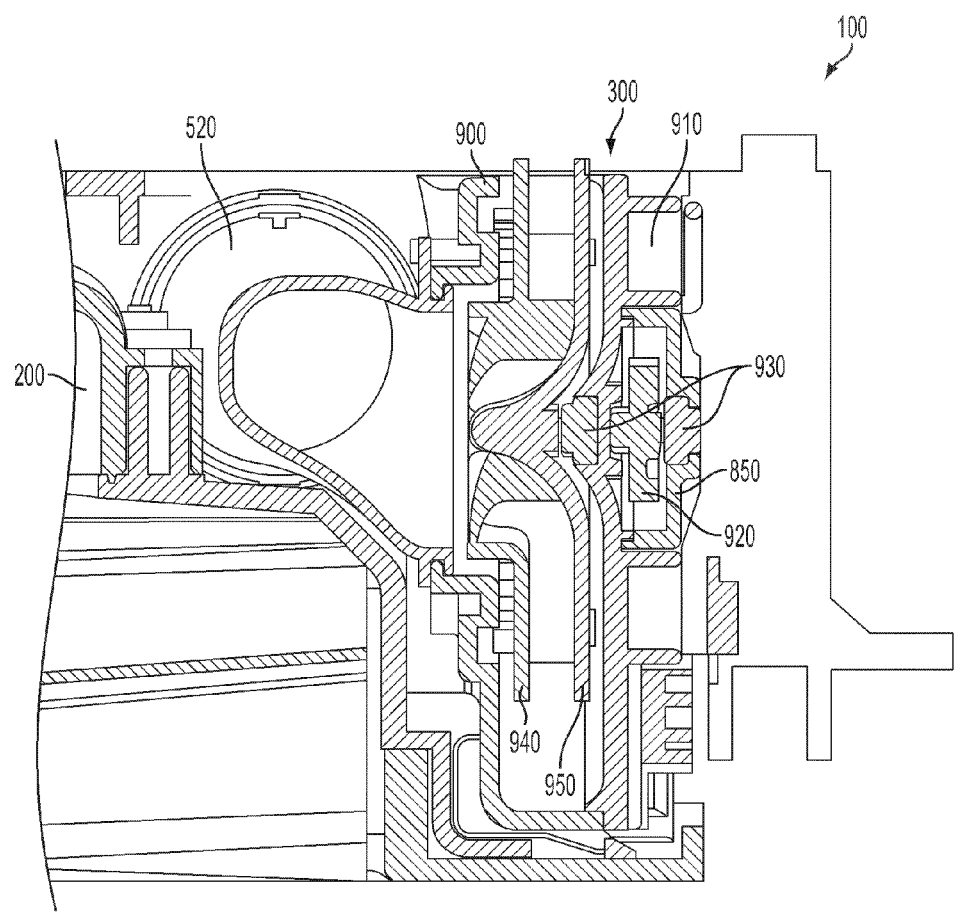
FIG. 9 is a cross-sectional view of the cleaning head embodiment of FIG. 5, taken through the impeller shown in FIG. 8.

FIG. 9 is a cross-sectional view of an embodiment of the robotic vacuum cleaning head 100 of FIG. 5, taken through the impeller 500 and a portion of the air inlet 520. The front roller 110 can also be seen, with a portion of the vacuum inlet 200 above it. A portion of the air inlet 520 to the impeller 500 is shown, the air inlet conduit mating with in inner portion 900 of the impeller housing as shown. The impeller 500 is enclosed by the inner portion 900 of the impeller housing and an outer portion 910 of the impeller housing. A gear 920 of the impeller gearbox is shown along with bushings 930 on each side thereof, which are housed between the outer portion 910 of the impeller housing and the gearbox cover 850. The illustrated impeller 500 includes an inner portion 940 and an outer portion 950 that can, for example, be snapped together, fastened, adhered, or integrally molded. In use, air is pulled by the impeller 500 from the dust bin through the air inlet.

Figure 10:
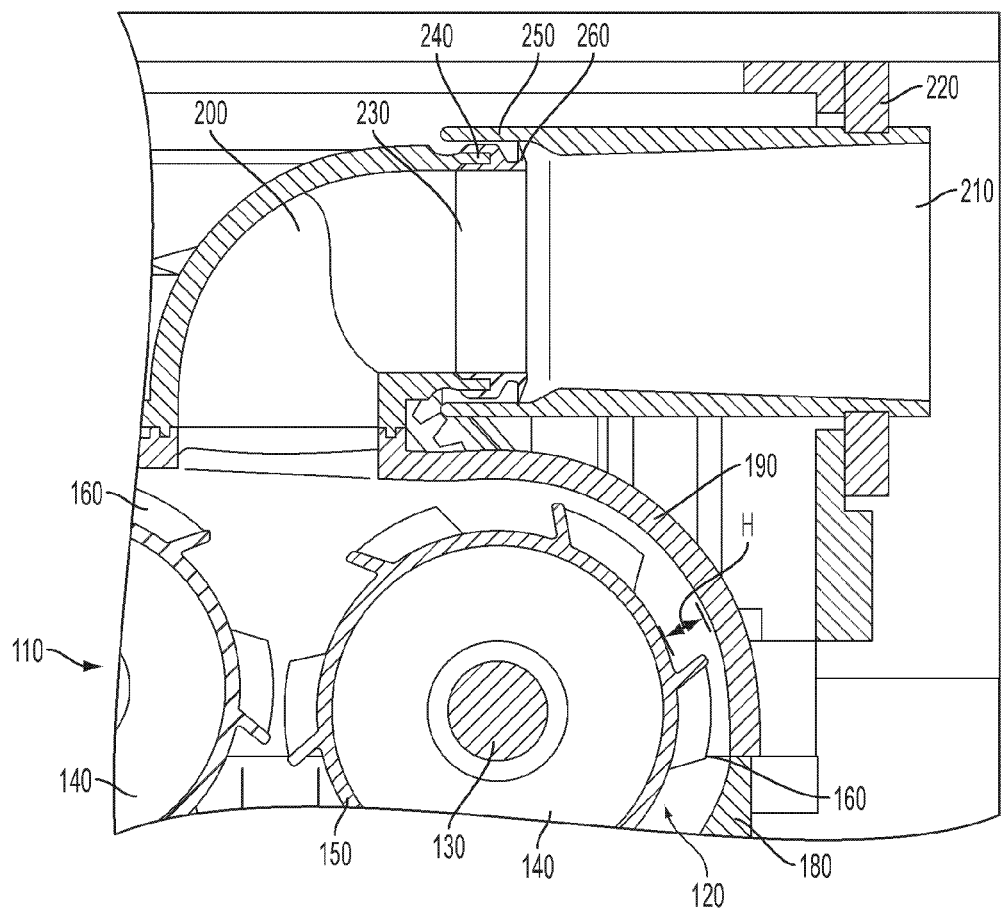
FIG. 10 is a cross-sectional view of an embodiment of the cleaning head in accordance with FIG. 2B.

FIGS. 10A and 10B are is a cross-sectional views of the cleaning head of FIGS. 2B and 5, showing respectively the plenum 210 in cutaway and the impeller air inlet conduit 520 in cutaway. As shown in FIG. 10A, in the embodiment of a cleaning head depicted in FIG. 2B the central plenum 210 is a low-friction plenum comprising, for example, a polyoxymethylene (e.g, Delrin®), which is an engineering thermoplastic used in precision parts that require high stiffness, low friction and excellent dimensional stability. In certain embodiment of the present teachings, a felt seal 220 can be provided to reduce friction, provide excellent wear resistance, and serve as a face seal between the cleaning head 100 and the dust bin (not shown). All seals within the cleaning head and between the cleaning head and the dust bin will be subject to a combination of rotation and translation forces along their surfaces as the cleaning head moves up and down within the robotic vacuum chassis.

FIG. 2 is a partial cross sectional view of the robotic vacuum cleaning head environment of FIG. 1, illustrating an exemplary embodiment of an annular seal 230 that can be employed between the vacuum conduit 200 and the central plenum 210. The illustrated annular seal 230 can be mounted to a protrusion 240 extending from an end of the vacuum conduit 200, the annular seal 230 facilitating a substantially airtight mating between the vacuum conduit 200 and an opening 250 of the central plenum 210. The illustrated exemplary annular seal 230 includes a rubber lip 260 configured to maintain an airtight seal between the vacuum conduit 200 and the central plenum 210, while allowing the vacuum conduit 200 and central plenum 210 to move relative to each other during operation of the robotic vacuum. The vacuum conduit 200 and the central plenum 210 may move relative to each other as the cleaning head moves relative to the robotic vacuum chassis. In the illustrated embodiment, the central plenum opening 250 has an increased radius to accommodate the vacuum conduit 200 and the annular seal 230, and provide room for relative movement of the vacuum conduit 200 and the central plenum 210.

The impeller inlet conduit 520 is shown to include two portions, a front portion 1010 and a rear portion 1020. The rear portion 1020 extends from the dust bin to the front portion 1010. The front portion 1010 extends from the rear portion 1020 to the impeller 500. A rotating and sliding seal arrangement 1030 is shown to mate the front portion 1010 of the air inlet conduit 520 with the rear portion 1020 of the air inlet conduit 520. Like the seal 230 between the vacuum conduit 200 and the central plenum 210 discussed with respect to FIG. 2B, the sliding seal arrangement 1030 between the front portion 1010 and the rear portion 1020 of the air inlet conduit 520 includes lips/protrusions (two are shown in the illustrated embodiment) that maintain an airtight seal between the air inlet and the air input duct, while allowing the air inlet and the air input duct to move relative to each other during operation of the robotic vacuum, and particularly while portions of the cleaning head "float" using the four-bar linkage described herein.

Figure 11:
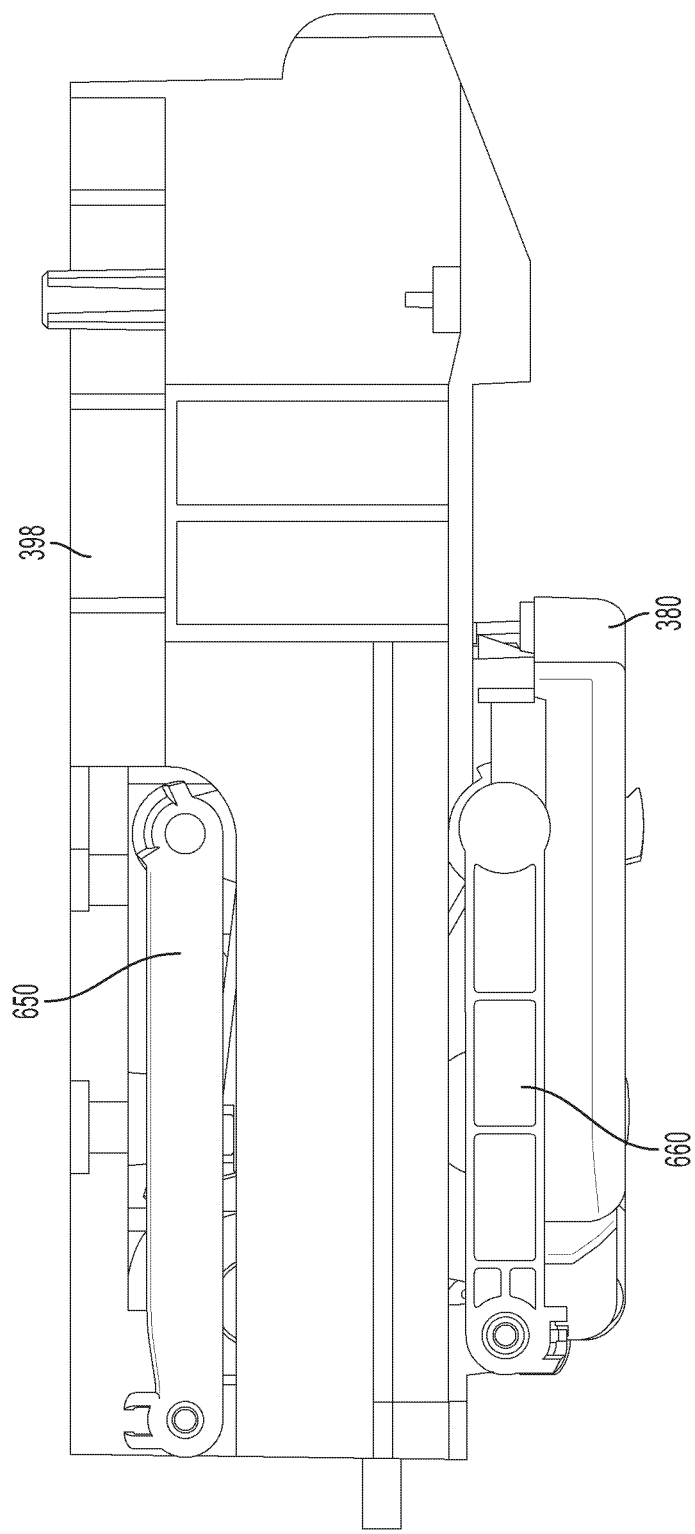
FIG. 11 is a side view of the cleaning head embodiment of FIG. 3, showing two arms of a four-bar linkage.
Figure 12:
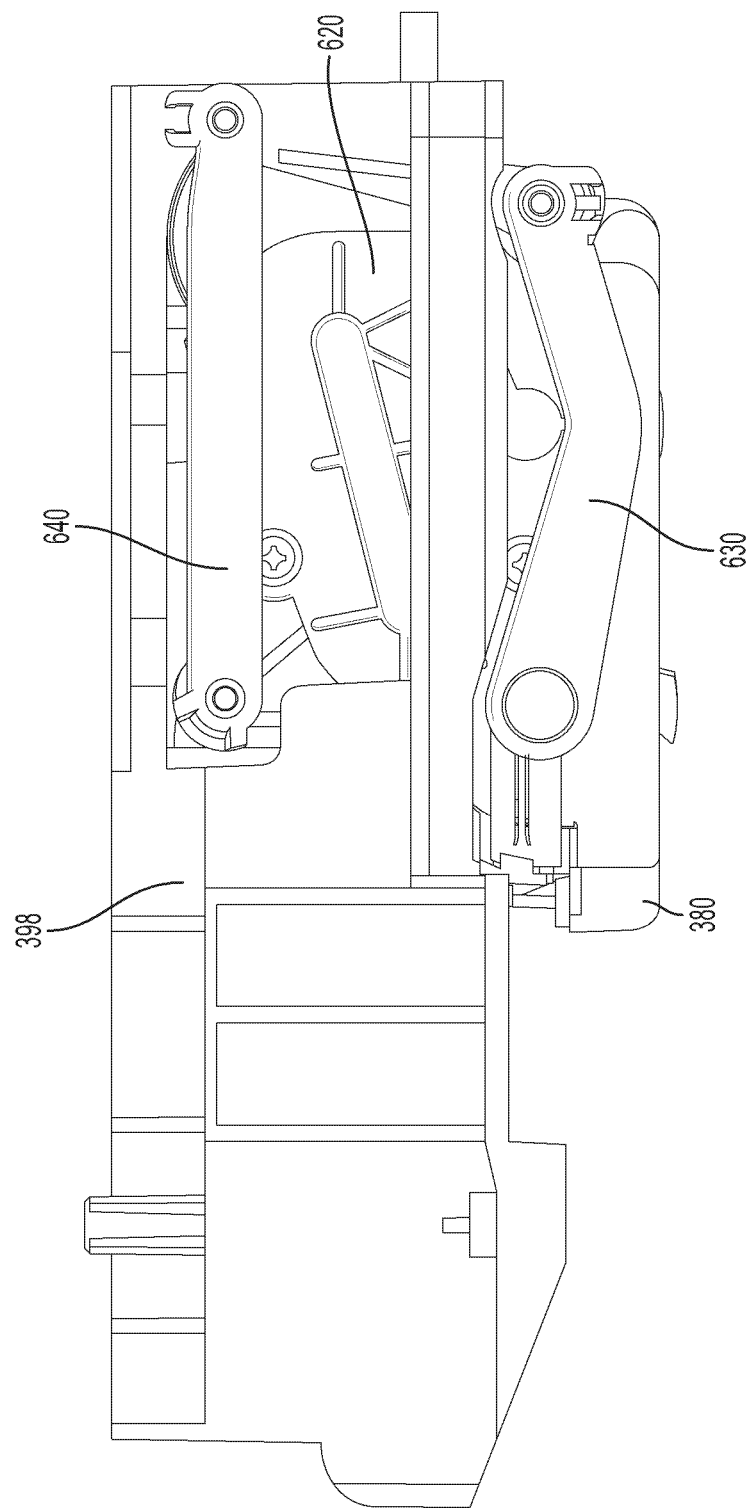
FIG. 12 is another side view of the cleaning head embodiment of FIG. 3, showing two other arms of the four-bar linkage.

FIG. 11 shows a left side view of a cleaning head of FIG. 4, wherein the frame 398 is shown, along with the attached link 650 and link 660 of one side's four-bar linkage that allows portions of the cleaning head 300 to move with respect to the frame 398 and thus the robotic vacuum chassis; and FIG. 12 shows a right side view of the cleaning head of FIG. 4, wherein the frame 398 is shown, along with the attached link 630 and fourth link 640 of the opposite side's four-bar linkage that allows portions of the cleaning head 300 to move with respect to the frame 398 and thus the robotic vacuum chassis.

In various embodiments of the present teachings, the four-bar linkage(s) operates to lift the front roller a slightly faster rate than the rear roller. In the illustrated embodiments, the four-bar linkage is "floating" the cleaning head, and the linkages have slightly different lengths (e.g., only millimeters different) and the points of attachment to the frame, cage, or cleaning head do not form a rectangle or a parallelogram.

Figure 13:
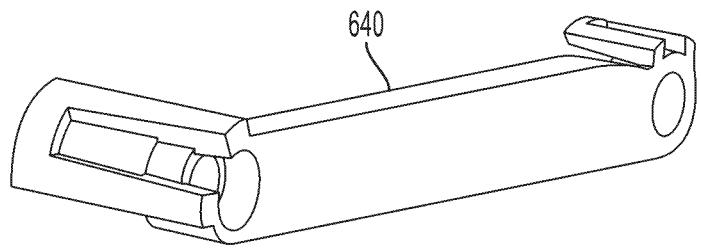
FIG. 13 is a perspective view of an exemplary arm for a four-bar linkage suspension in accordance with the present teachings.
Figure 14:
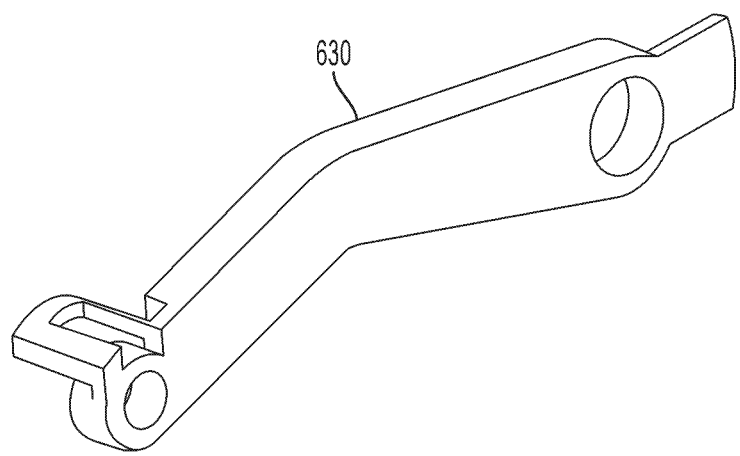
FIG. 14 is a perspective view of another exemplary arm for a four-bar linkage suspension in accordance with the present teachings.

FIGS. 13 and 14 are perspective views of an exemplary links for a four-bar linkage suspension in accordance with the present teachings, for example the link 550 of the embodiment of FIG. 4 or the link 640 of the embodiment of FIG. 12. FIG. 13 depicts a substantially straight link; FIG. 14 depicts one having a bent, somewhat shallow V-shape. In various embodiments of the present teachings, the arms can comprise, for example, PEI, PC, Acetal, Nylon 6, PBT, PC/PET, ABS, PET, or a combination thereof.

Figure 15:
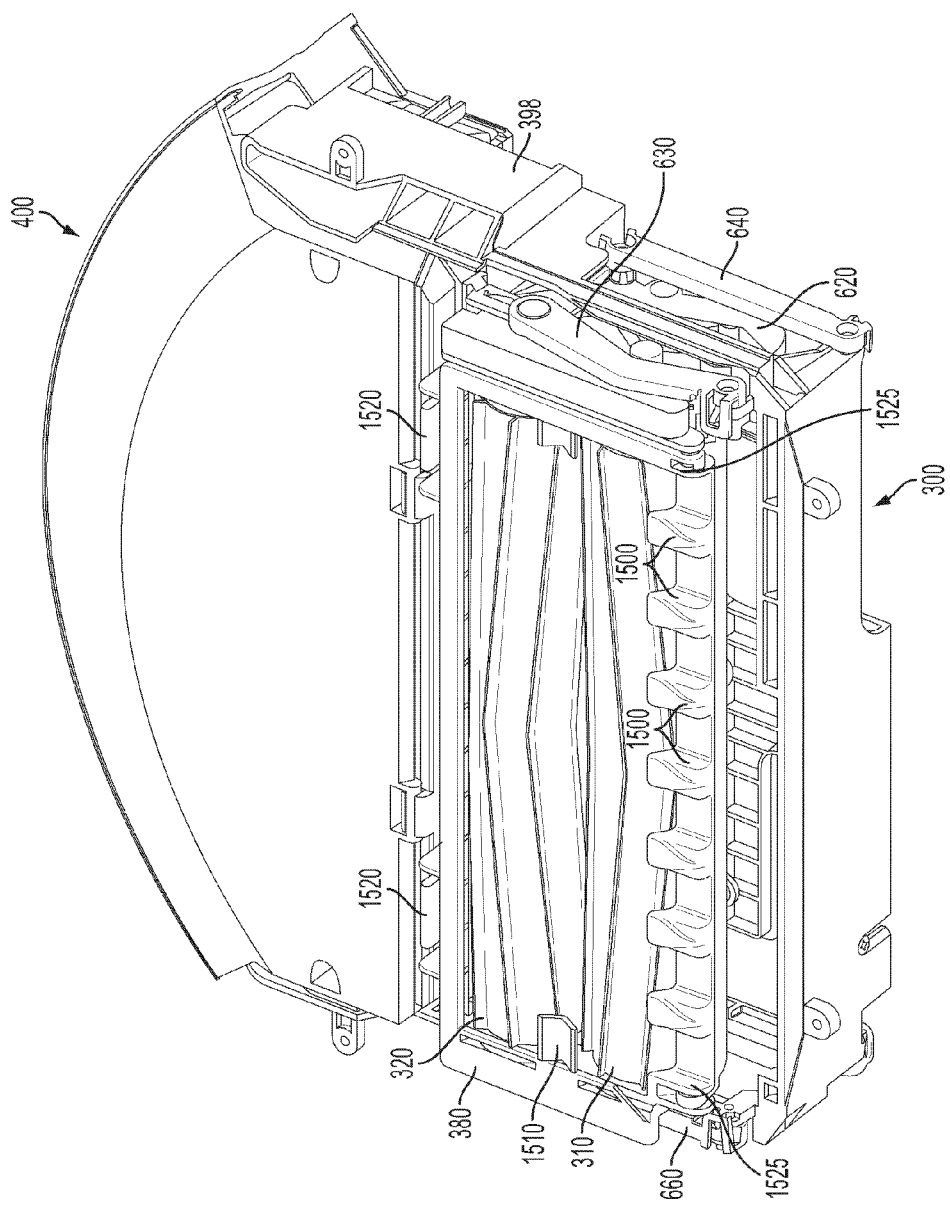
FIG. 15 is bottom perspective view of the embodiment of FIG. 3.

FIG. 15 is a bottom perspective view of the cleaning head 300 and dust bin 400 embodiment of FIG. 5, with the dust bin 400 removably engaged with the cleaning head 300. The rollers 310, 320 are shown, along with the roller frame 380 in a closed position. In embodiments of the present teachings including a removable roller frame 380 allowing access to the roller 310, 320 for, for example, removal or cleaning of the rollers 310, 320. The roller frame 380 can be releasably and hingedly attached to the gearbox 620 or the lower housing 390, for example via hinges 1525 and tabs 1520 of a known sort. The tabs 1520 can be pressed toward a front of the cleaning head to release the rear side of the roller frame 380 and the roller frame 380 can pivot open to provide access to the rollers 310, 320. The illustrated exemplary roller frame 380 shown in FIG. 15 includes multiple prows 1500 on a forward edge. The prows can be provided to support the cleaning head as it floats across the surface to be cleaned, and also limit the size of debris that can enter the cleaning head to the size of the vacuum conduit. The illustrated exemplary roller frame 380 also incudes "norkers" 1510 that can be used to prevent cords and other long, thin material from getting pulled between the rollers 310, 320. In the context of this specification, a "norker" is a short, V-shaped trough as depicted. The "norkers" 1510 are located at very end of the rollers 310, 320, and can additionally prevent larger debris from entering between the rollers 310, 320 at the end of the rollers 310 where the rollers may not be as compressible. In some embodiments, the tubular outer shell of the roller, which itself can deform substantially, abuts a hard cylindrical core at the end of the roller. The purpose of the "norker" is to prevent captured objects larger than a certain size (e.g., larger than the gap G) from jamming between the rollers at the very ends, where the rollers may not deform because of the hard cylindrical core at the roller end.

Figure 16:
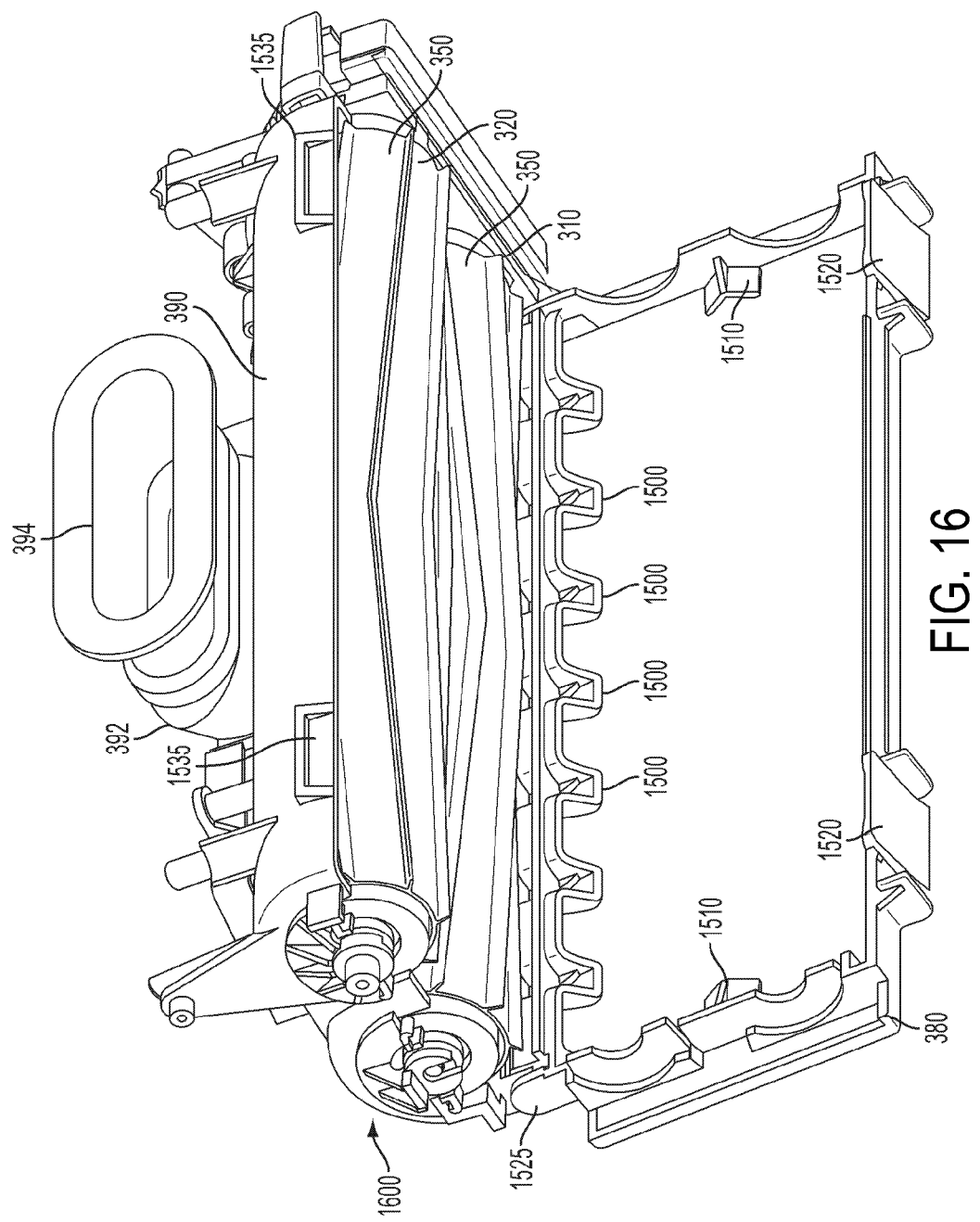
FIG. 16 is bottom perspective view of a portion of the cleaning head embodiment of FIG. 3 with a roller frame opened to expose the rollers.

FIG. 16 is a bottom perspective view of the cleaning head of FIG. 15, with the roller frame 380 open to expose the rollers 310, 320. As can be seen, some of the roller area covered by the norkers 1510 may not be the compressible, resilient tubing 350 of the rollers. The tabs 1520 that allow the roller frame 380 to release from the lower housing 390 can releasably engage latching mechanisms 1535 of the lower housing 390 to close the roller housing 380. The non-driven ends 1600 of the rollers 310, 320 are shown in FIG. 16 and an exemplary embodiment thereof is shown in FIG. 19 and described below.

Figure 17:
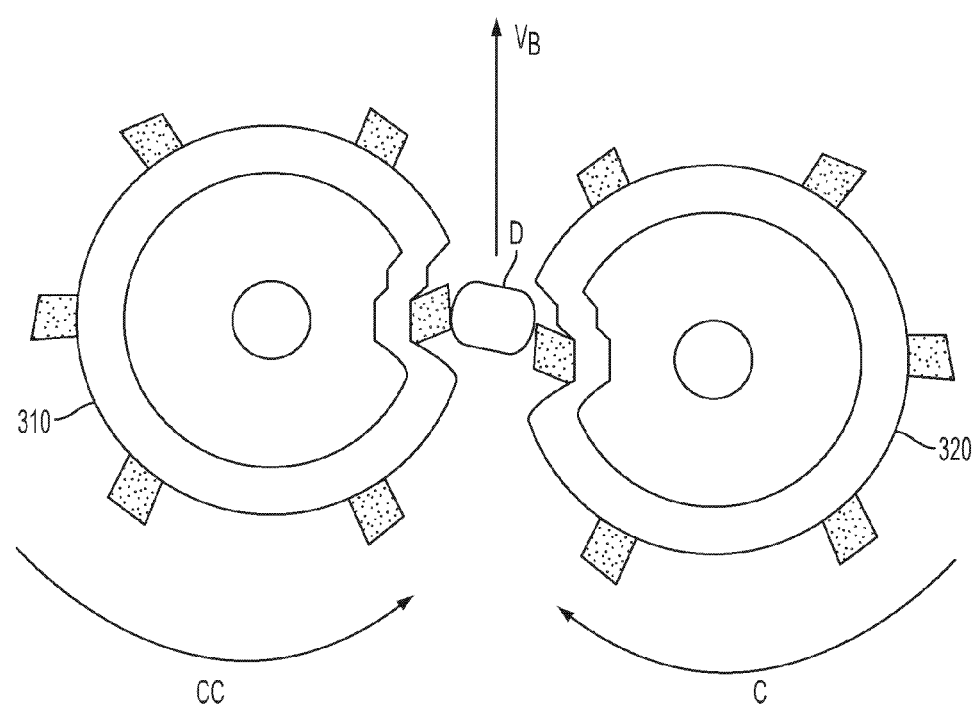
FIG. 17 illustrates, schematically, passage of large debris through exemplary collapsible resilient rollers in accordance with embodiments of the present teachings.

FIG. 17 schematically illustrates a large piece of debris D being accommodated by the rollers 310, 320, the rollers being collapsible to allow the debris D to pass through a center of the rollers 310, 320, despite the size of the debris D being larger than the gap between the rollers. After the debris D has passed through the roller 310, 320, the rollers will retain (rebound to) their circular cross section due to their resiliency and the debris will move upward toward a dust bin conduit in a direction $V_B$. As shown, the front roller 310 rotates in a roll rotation direction CC and the rear roller 320 rotates in a climb rotation direction C.

Figure 18:
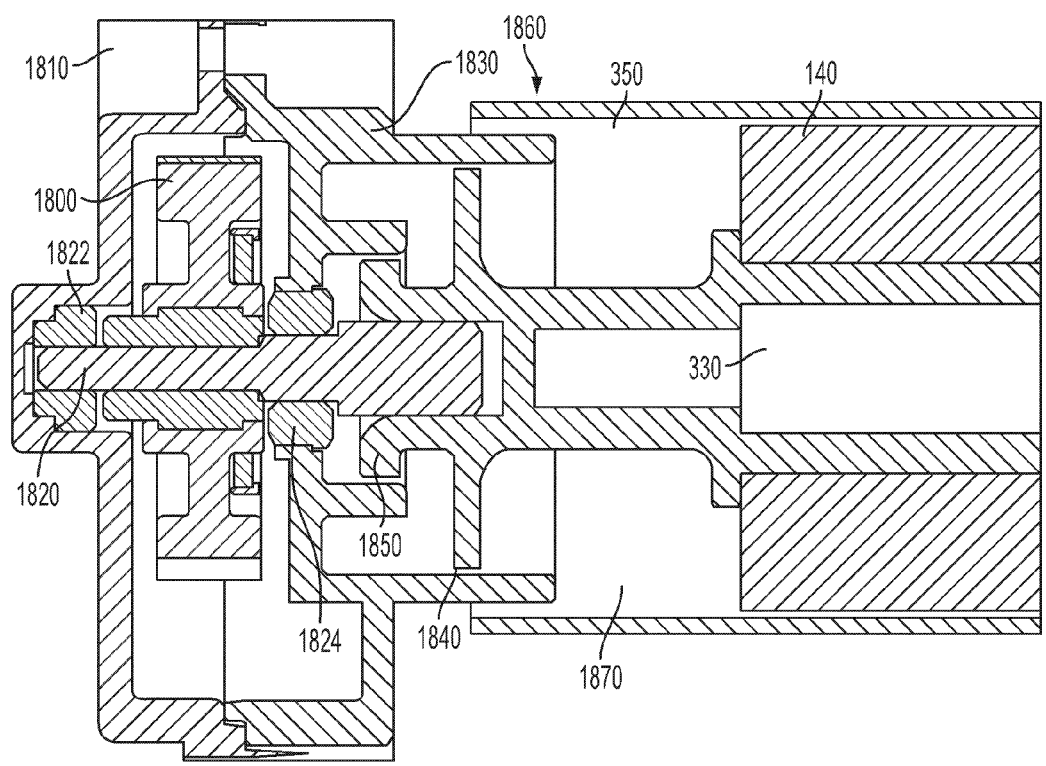
FIG. 18 is a partial cross-sectional view of an exemplary embodiment of a driven end of a roller in accordance with the present teachings.

FIG. 18 is a cross sectional view of an exemplary driven end of an embodiment of a cleaning head roller (e.g., rollers 110, 120, 310, 320) in accordance with the present teachings. The roller drive gear 1800 is shown in the gearbox housing 1810, along with a roller drive shaft 1820 and two bushings 1822, 1824. The roller drive shaft 1820 can have, for example, a square cross section or a hexagonal cross section as would be appreciate by those skilled in the art. A shroud 1830 is shown to extend from the within the roller tube 350 to contact the gearbox housing 1810 and the bearing 1824 and can prevent hair and debris from reaching the gear 1800. The axle 330 of the roller engages the roller drive shaft 1820. In the illustrated embodiment, the area of the axle 330 surrounding the drive shaft 1800 includes a larger flange or guard 1840 and a smaller flange or guard 1850 spaced outwardly therefrom. The flanges/guards 1840, 1850 cooperate with the shroud 1830 to prevent hair and other debris from migrating toward the gear 1800. An exemplary tube overlap region 1860 is shown, where the tube 350 overlaps the shroud 1830. The flanges and overlapping portions of the drive end shown in FIG. 18 can create a labyrinth-type seal to prevent movement of hair and debris toward the gear. In certain embodiments, hair and debris that manages to enter the roller despite the shroud overlap region 1860 can gather within a hair well or hollow pocket 1870 that can collect hair and debris in a manner that substantially prevents the hair and debris from interfering with operation of the cleaning head. Another hair well or hollow pocket can be defined by the larger flange 1840 and the shroud 1830. In certain embodiments, the axle and a surrounding collapsible core preferably extend from a hair well on this driven end of the roller to a hair well or other shroud-type structure on the other non-driven end of the roller. In other embodiments, curvilinear spokes replace all or a portion of the foam supporting the tube 350.

Figure 19:
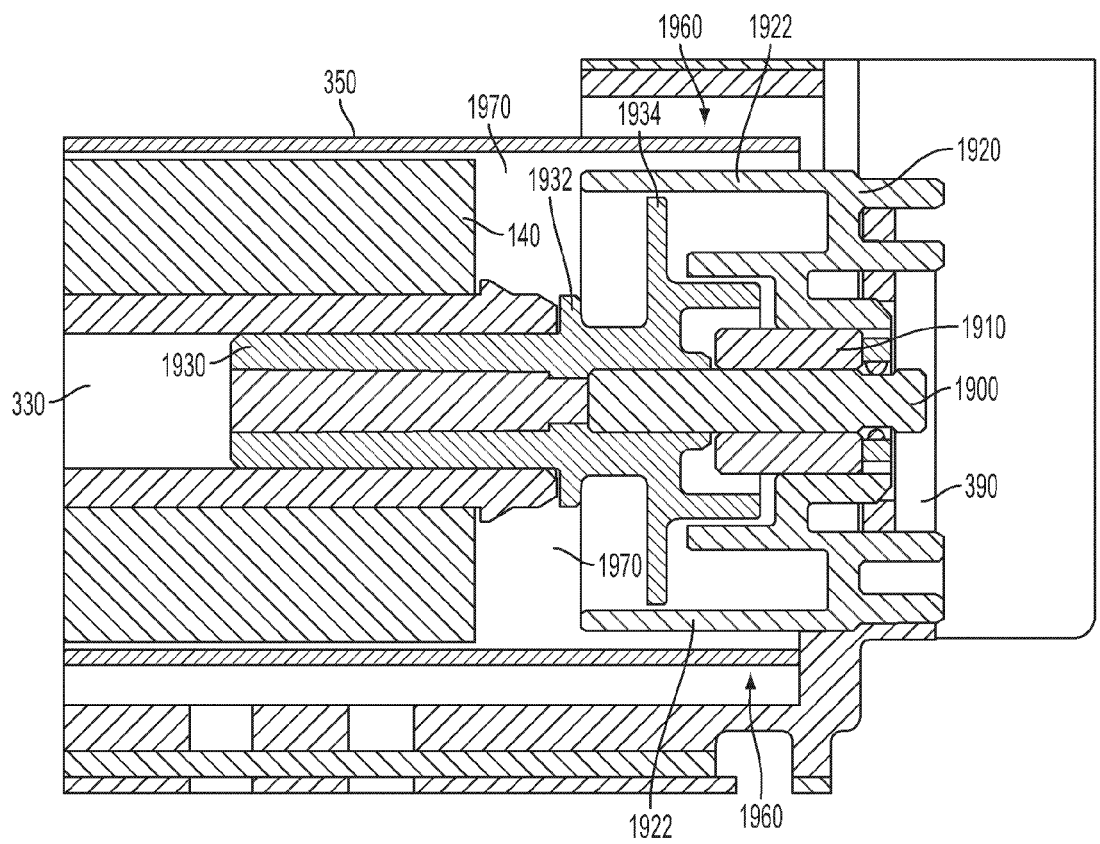
FIG. 19 is a partial cross-sectional view of an exemplary embodiment of a non-driven end of a roller in accordance with the present teachings.

FIG. 19 is a cross sectional view of an exemplary non-driven end of an embodiment of a cleaning head roller (e.g., rollers 110, 120, 310, 320) in accordance with the present teachings. A pin 1900 and bushing 1910 of the non-driven end of the roller are shown seated in the cleaning head lower housing 390. A shroud extends from the bushing housing 1920 into the roller tube 350, for example with legs 1922, to surround the pin 1900 and bushing 1910, as well as an axle insert 1930 having a smaller flange or guard 1932 and a larger flange or guard 1934, the larger flange 1934 extending outwardly to almost contact an inner surface of the shroud 1920. An exemplary tube overlap region 1960 is shown, where the tube 350 overlaps the shroud 1920. The flanges/guards and overlapping portions of the drive end shown in FIG. 19 can create a labyrinth-type seal to prevent movement of hair and debris toward the gear. The shroud is preferably shaped to prevent entry of hair into an interior of the roller and migration of hair to an area of the pin. In certain embodiments, hair and debris that manages to enter the roller despite the shroud overlap region 1960 can gather within a hair well or hollow pocket 1970 that can collect hair and debris in a manner that substantially prevents the hair and debris from interfering with operation of the cleaning head. Another hair well or hollow pocket can be defined by the larger flange 1934 and the shroud 1920.

Figure 20:
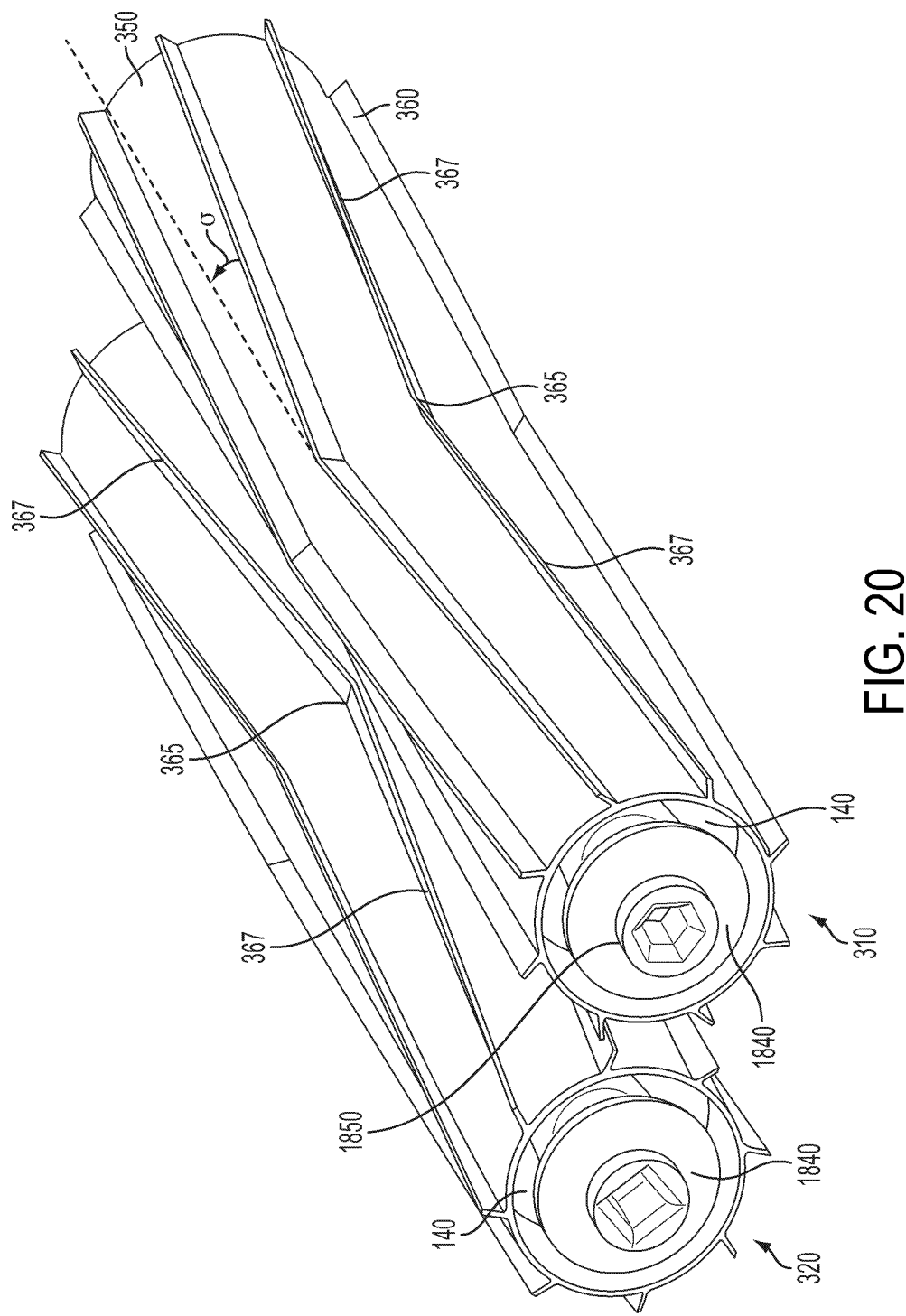
FIG. 20 is a side perspective view of an exemplary embodiment of resilient rollers in accordance with the present teachings.

FIG. 20 illustrates exemplary facing, spaced chevron vane rollers such as the front roller 310 and rear roller 320 of FIG. 3. The flanges 1840 and 1850 of the axle 330 can be seen, as can the foam 140 supporting the tubular tube 350. The rollers 310, 320 face each other, which means that, in the illustrated embodiment, the chevron-shaped vanes 360 are mirror images. Each chevron-shaped vane of the illustrated exemplary rollers include a central point 365 and two sides or legs 367 extending downwardly therefrom on the front roller 310 and upwardly therefrom on the rear roller 320. The chevron shape of the vane 360 can draw hair and debris away from the sides of the rollers and toward a center of the rollers to further prevent hair and debris from migrating toward the roller ends where they can interfere with operation of the robotic vacuum.

Figure 21:
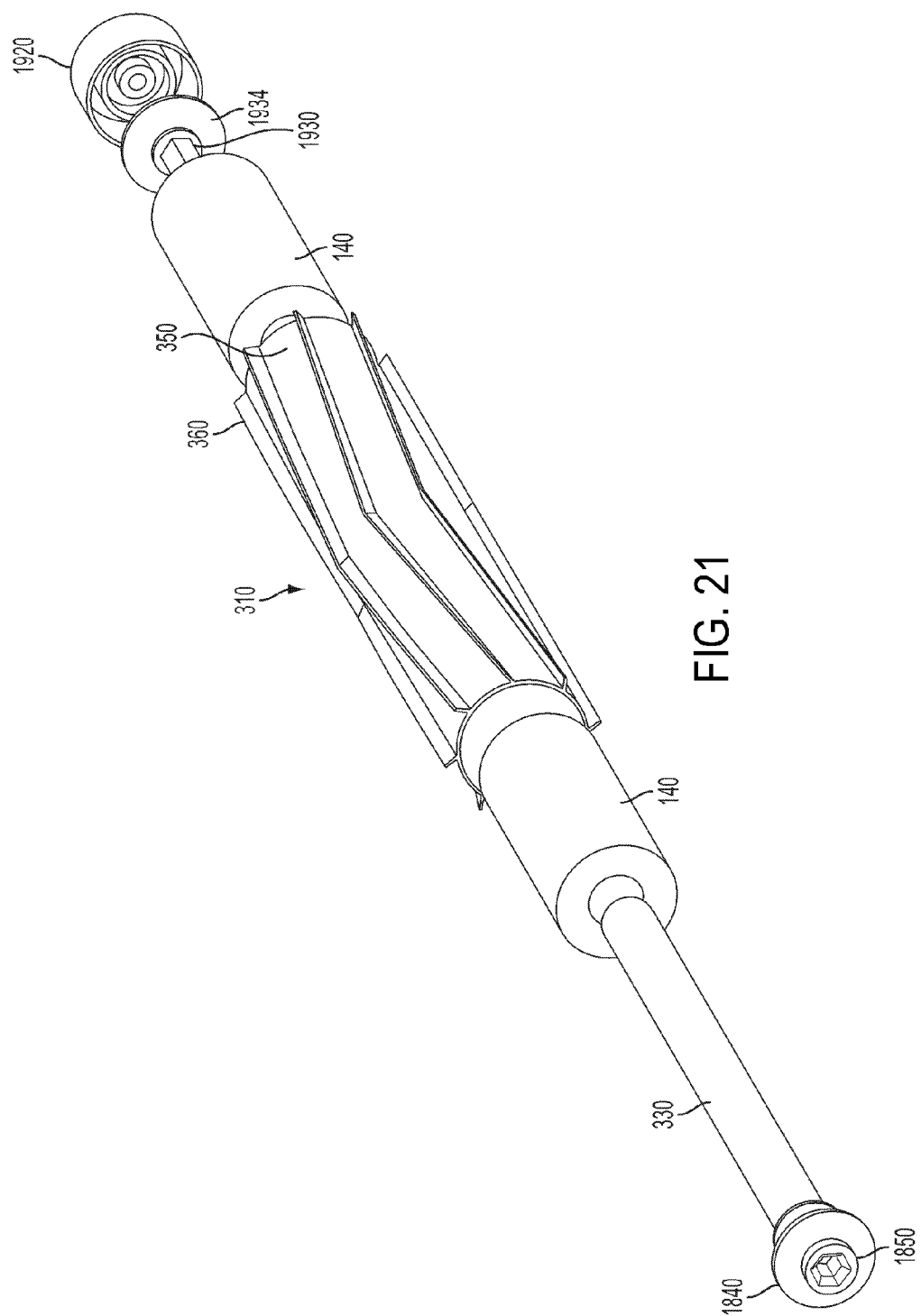
FIG. 21 is an exploded side perspective view of an exemplary embodiment of a resilient roller in accordance with the present teachings.

FIG. 21 illustrates a side perspective exploded view of an exemplary embodiment of a roller, such as roller 310 of FIG. 20. The axle 330 is shown, along with the flanges 1840 and 1850 of its driven end. The axle insert 1930 and flange 1934 of the non-driven end are also shown, along with the shroud 1920 of the non-driven end. Two foam inserts 140 are shown, which fit into the tubular tube 350 to provide a collapsible, resilient core for the tube. In certain embodiments, the foam inserts can be replaced by curvilinear spokes (e.g., spokes 340 shown in FIG. 6, or can be combined with curvilinear spokes. The curvilinear spokes can support the central portion of the roller 310, between the two foam inserts 140 and can, for example, be integrally molded with the roller tube 350 and chevron vane 360.

Figure 22:
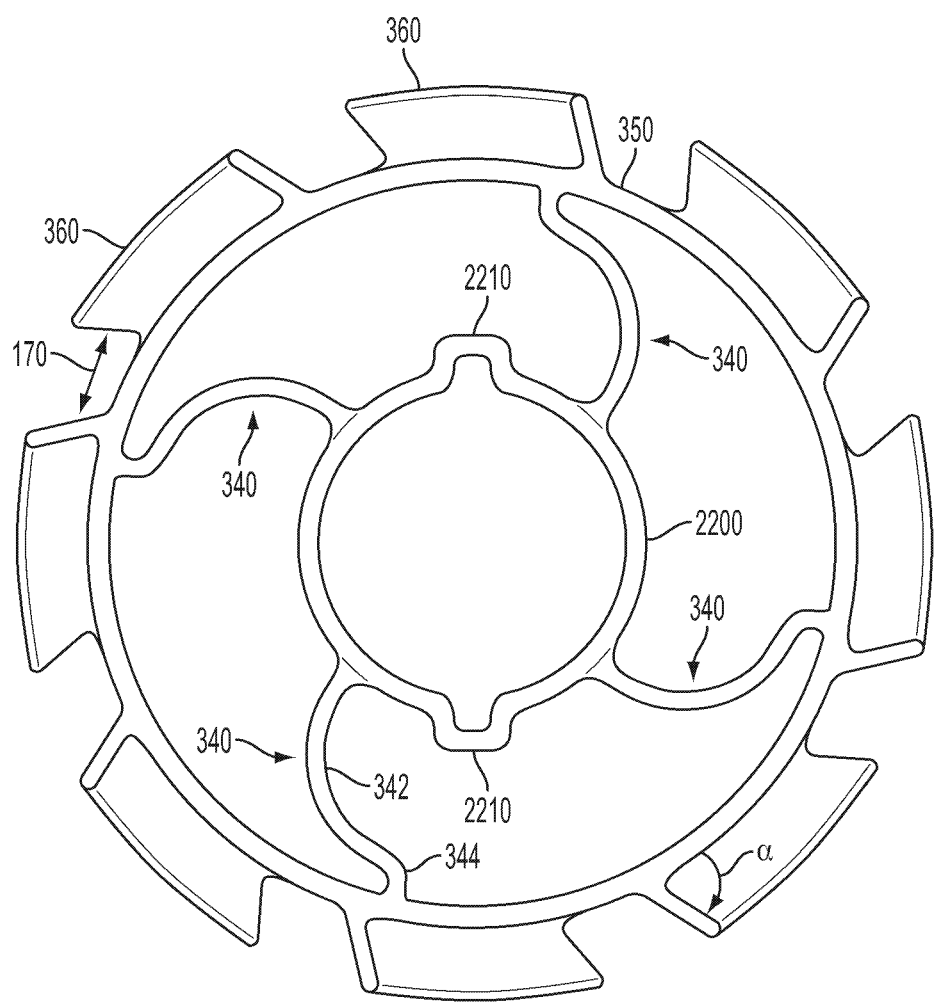
FIG. 22 is a cross-sectional view of an exemplary embodiment of a roller having a spoked resilient support in accordance with the present teachings.

FIG. 22 illustrates a cross sectional view of an exemplary roller having curvilinear spokes 340 supporting the chevron vane tube 350. As shown, the curvilinear spokes can have a first (inner) portion 342 curvilinear in a first direction, and a second (outer) portion 344 that is either lacks curvature or curves in an opposite direction. The relative lengths of the portions can vary and can be selected based on such factors as molding requirements and desired firmness/collapsibility/resiliency. A central hub 2200 of the roller can be sized and shaped to mate with the axle that drives the roller (e.g., axle 330 of FIG. 21). To transfer rotational torque from the axle to the roller, the illustrated roller includes two recesses or engagement elements/receptacles 2210 that are configured to receive protrusions or keys 335 (see FIG. 6) of the axle. One skilled in the art will understand that other methods exist for mating the axle and the roller that will transfer rotational torque from the axle to the roller.

Figure 23:
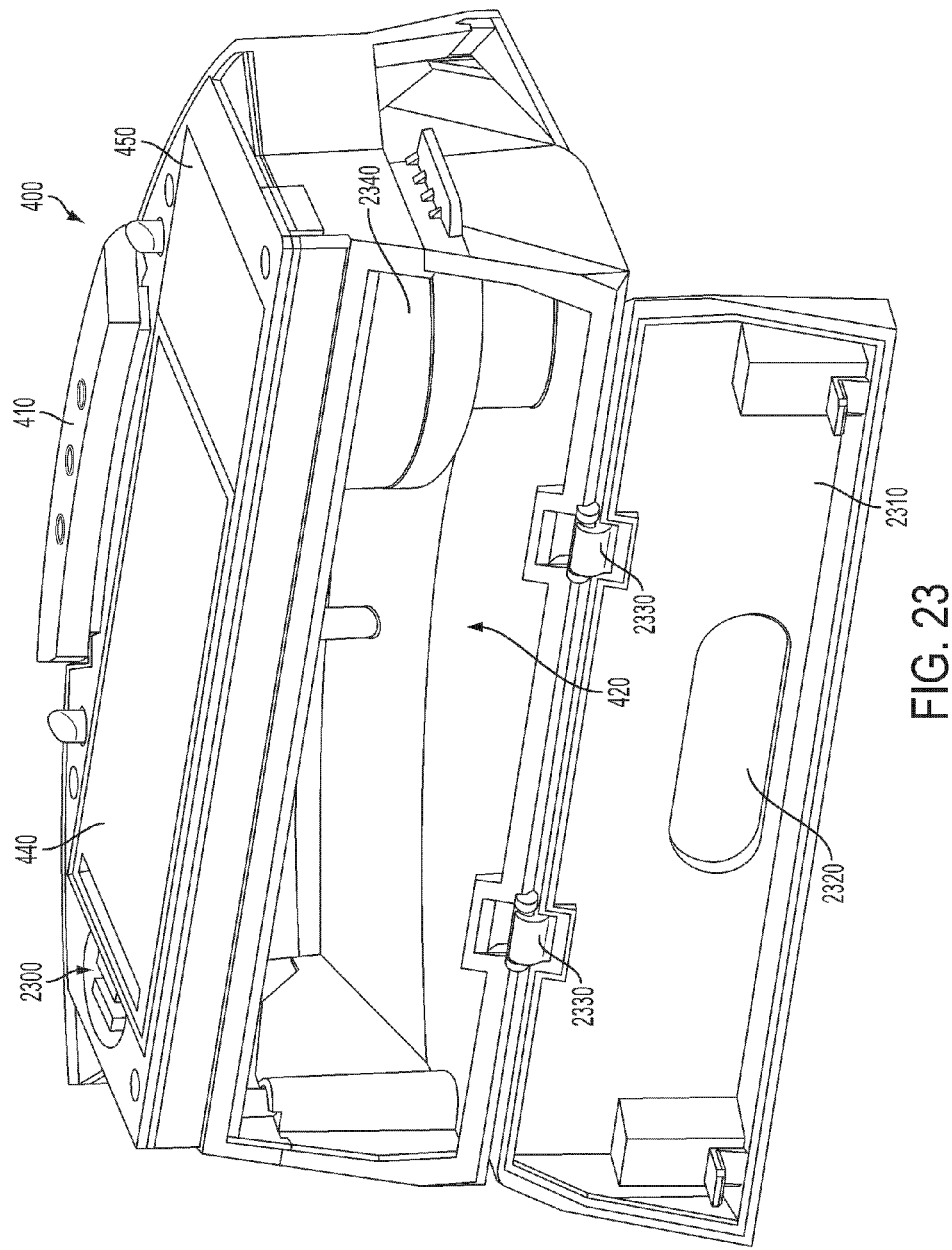
FIG. 23 is a front perspective view of a dust bin accordance with the present teachings, having a front bin door open.
Figure 24:
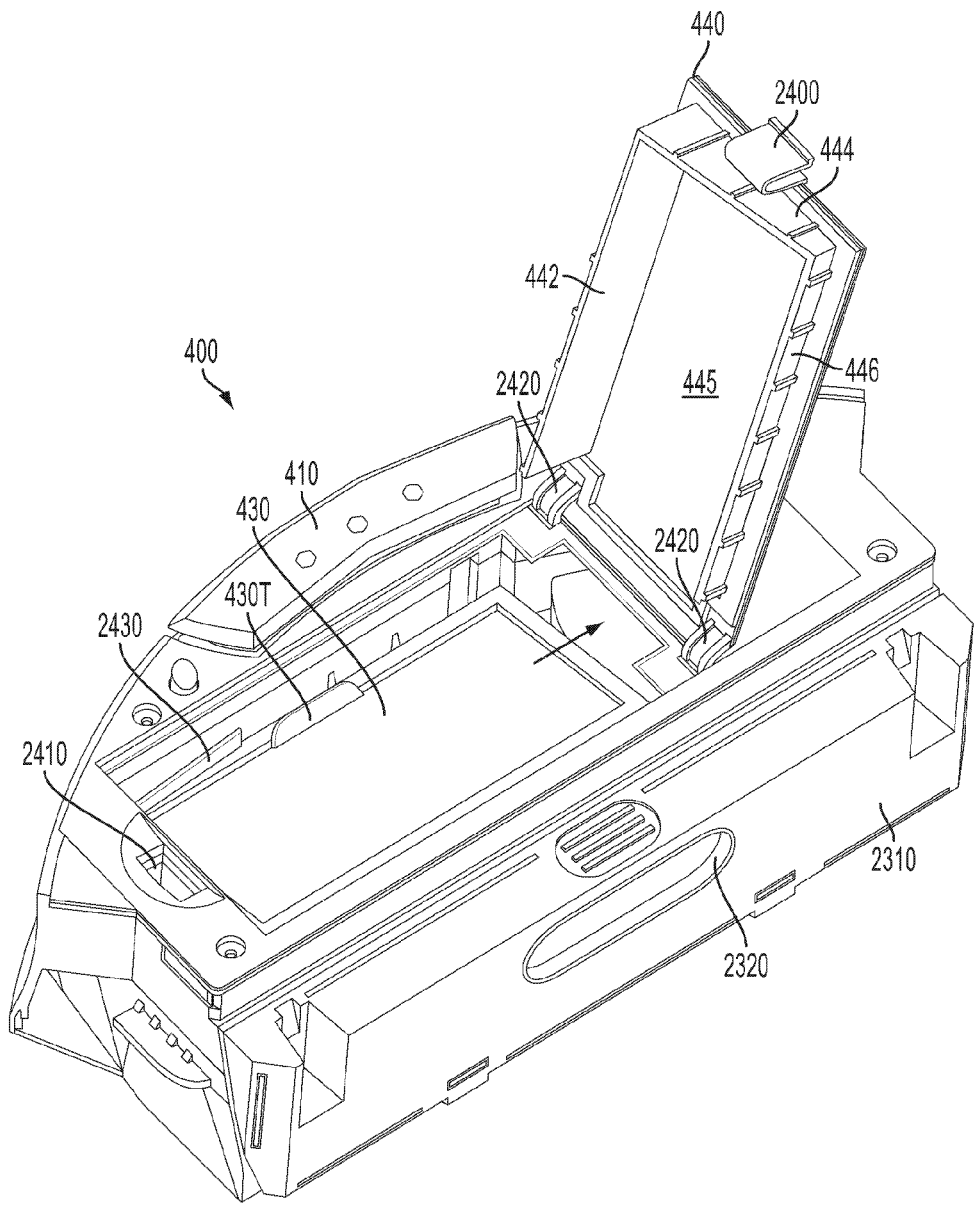
FIG. 24 is a top perspective view of the dust bin of FIG. 24, having a filter access door open.

FIG. 23 is a front perspective view of an exemplary embodiment of a dust bin 400 in accordance with the present teachings. The dust bin includes, on its top surface a release mechanism 410 and a filter door 440. In certain embodiments, the vacuum impeller would be housed within the dust bin under the portion 450 of the top surface of the bin. Indeed, the portion 450 of the top surface can be a removable panel allowing access to the vacuum impeller. The embodiment of FIG. 23 also illustrates a filter door release mechanism 2300 that, as shown in FIG. 24, can include a resilient tab 2400 and a recess 2410 that the tab engages in a known manner. A door 2310 of the dust bin 400 is shown in a open position, exposing hinges 2330 and the cavity 420 for debris collection. The door 2310 includes an opening 2320 that preferably matches up in size and location with, for example, the central plenum 394 of the cleaning head 300 shown in FIGS. 5 and 6. An impeller housing 2340 is located within the housing. In the illustrated embodiment, the impeller housing 2340 is located toward a side of the dust bin cavity 420.

FIG. 24 is a top perspective view of the dust bin 400 of FIG. 23, showing the filter door 440 in an open position that exposes the filter 430 and the walls 442, 444, 446 that partially define the air flow cavity 445 that allows air to flow from the filter 430 to a vacuum impeller housed within the dust bin cavity 420. In the illustrated embodiment, air flows from the central plenum (e.g., central plenum 394 of FIG. 5) through the opening 2320 in the filter door 2310, through the filter 430, and through the air flow cavity 445 in the direction of the arrow of FIG. 24 to reach the vacuum impeller. The filter 430 is preferably releasable and includes a tab 430T that allows a user to remove the filter 430 from the dust bin, for example for cleaning and/or replacement. The exemplary embodiment of FIG. 24 includes an optional a "filter presence" indicator tab 2430 within a filter cavity. The filter presence indicator tab 2430 can, for example, prevent operation of the robotic vacuum when the filter 430 is not properly installed, for example by moving to a position that prevents the filter door 440 from closing, which in turn prevents the removable dust bin 400 from being installed in the robotic vacuum. In a preferred embodiment of the present teachings, the filter is sealed within the surrounding portion of the dust bin. The seal can be employed on the filter, on the dust bin, or on both the filter and the dust bin.

Figure 25:
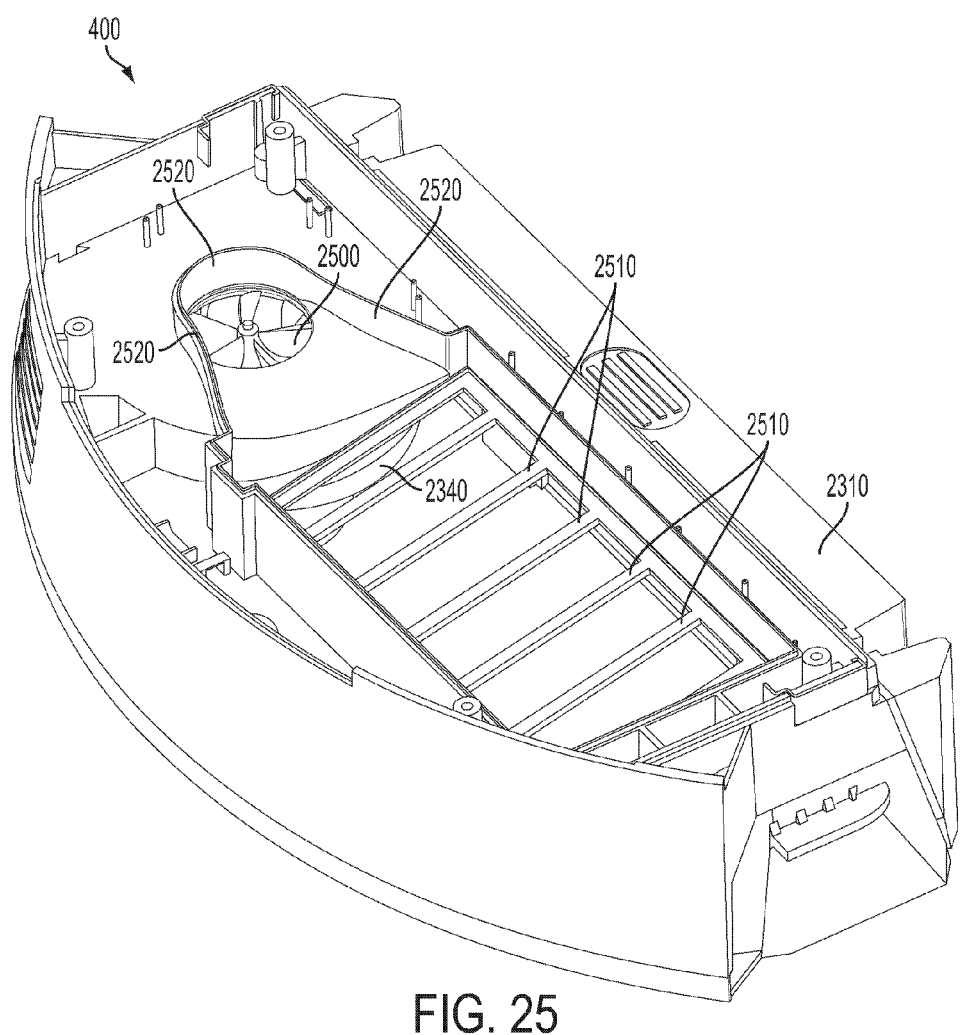
FIG. 25 is a top perspective view of the dust bin of FIG. 24, having the bin top and filter removed.

FIG. 25 is a top perspective view of a portion of the dust bin 400 of FIGS. 23 and 24, with a top portion of the dust bin and the filter 430 removed. In the exemplary embodiment, a multiple bars 2510 are used to retain the filter 430 within the dust bin. One skilled in the art will appreciate that other arrangements can be used to support and retain the filter within the dust bin. In certain embodiments of the present teachings, a transverse cross sectional area of the air flow cavity 445 (e.g. a cross section taken transverse to the longitudinal axis) equals the cross sectional area of the impeller opening 2500 such that airflow remains constant and free of airflow contraction and/or constriction throughout the volume and into the debris collection bin.

Figure 26:
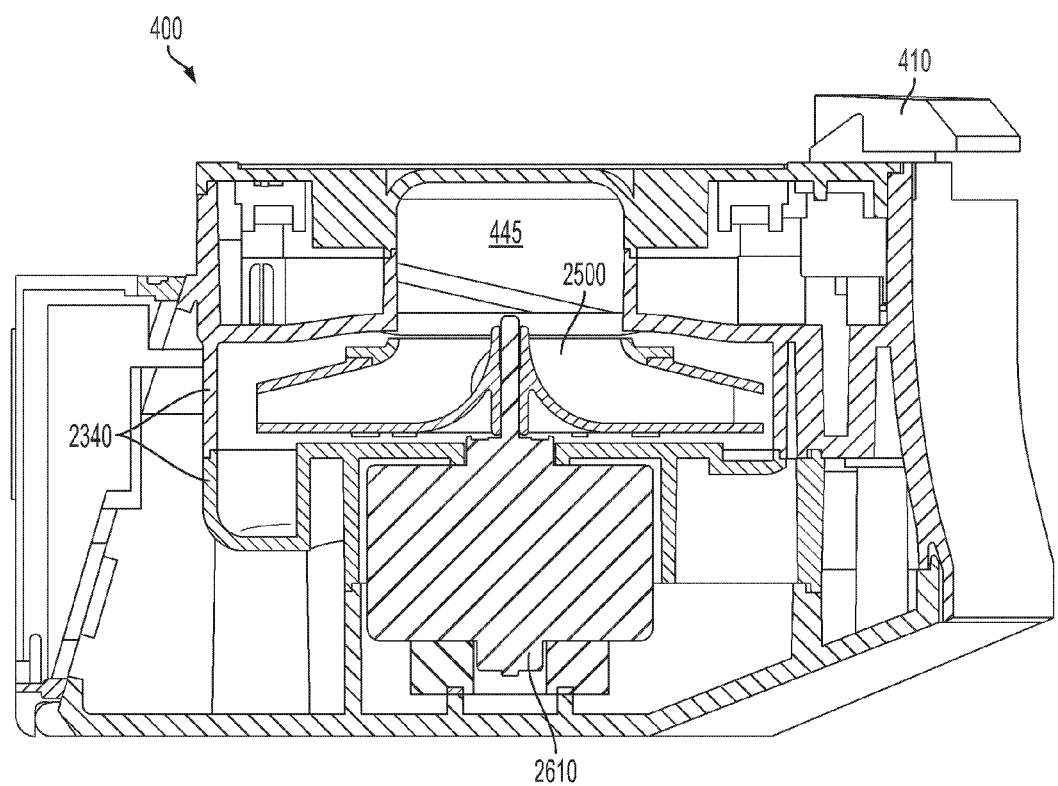
FIG. 26 is a cross sectional view of the dust bin of FIG. 23, taken through the impeller housing.

FIG. 26 is a cross sectional view of the dust bin of FIGS. 23-25, taken through the impeller housing 2340, the impeller motor 2610, and the impeller 2620. The pathway from the air flow cavity 445 to the impeller 2500 can be seen.

Other embodiments of the present teachings will be apparent to those skilled in the art from consideration of the specification and practice of the teachings disclosed herein, some exemplary embodiments of which are set forth in the details and descriptions below.

In certain embodiments of the present teachings, the one or more vanes are integrally formed with the resilient tubular member and define V-shaped chevrons extending from one end of the resilient tubular member to the other end. In one embodiment, the one or more chevron vanes are equidistantly spaced around the circumference of the resilient tube member. In one embodiment, the vanes are aligned such that the ends of one chevron are coplanar with a central tip of an adjacent chevron. This arrangement provides constant contact between the chevron vanes and a contact surface with which the compressible roller engages. Such uninterrupted contact eliminates noise otherwise created by varying between contact and no contact conditions. In one implementation, the one or more chevron vanes extend from the outer surface of the tubular roller at an angle $\alpha$ between 30° and 60° relative to a radial axis and inclined toward the direction of rotation (see FIG. 20). In one embodiment the angle $\alpha$ of the chevron vanes is 45° to the radial axis. Angling the chevron vanes in the direction of rotation reduces stress at the root of the vane, thereby reducing or eliminating the likelihood of vane tearing away from the resilient tubular member. The one or more chevron vanes contact debris on a cleaning surface and direct the debris in the direction of rotation of the compressible roller.

In one implementation, the vanes are V-shaped chevrons and the legs of the V are at a 5° to 10° angle $\theta$ relative a linear path traced on the surface of the tubular member and extending from one end of the resilient tubular member to the other end (see FIG. 22). In one embodiment, the two legs of the V-shaped chevron are at an angle θ of 7°. By limiting the angle θ to less than 10° the compressible roller is manufacturable by molding processes. Angles steeper than 10° create failures in manufacturability for elastomers having a durometer harder than 80 A. In one embodiment, the tubular member and curvilinear spokes and hub are injection molded from a resilient material of a durometer between 60 and 80 A. A soft durometer material than this range may exhibit premature wear and catastrophic rupture and a resilient material of harder durometer will create substantial drag (i.e. resistance to rotation) and will result in fatigue and stress fracture. In one embodiment, the resilient tubular member is manufactured from TPU and the wall of the resilient tubular member has a thickness of about 1 mm. In one embodiment, the inner diameter of the resilient tubular member is about 23 mm and the outer diameter is about 25 mm. In one embodiment of the resilient tubular member having a plurality of chevron vanes, the diameter of the outside circumference swept by the tips of the plurality of vanes is 30 mm.

Because the one or more chevron vanes extend from the outer surface of the resilient tubular member by a height that is, in one embodiment, at least 10% of the diameter of the resilient tubular roller, they prevent cord like elements from directly wrapping around the outer surface of the resilient tubular member. The one or more vanes therefore prevent hair or other string like debris from wrapping tightly around the core of the compressible roller and reducing efficacy of cleaning. Defining the vanes as V-shaped chevrons further assists with directing hair and other debris from the ends of a roller toward the center of the roller, where the point of the V-shaped chevron is located. In one embodiment the V-shaped chevron point is located directly in line with the center of a vacuum inlet of the autonomous coverage robot.

The four-bar linkage embodiments discussed hereinabove facilitate movement ("floating") of the cleaning head within its frame. When a robotic vacuum having a cleaning head in accordance with the present teachings is operating, it is preferable that a bottom surface of the cleaning head remain substantially parallel to the floor, and in some embodiments, it is preferable that the front roller 110, 310 be positioned slightly higher than the rear roller 120, 320 during operation. However, the cleaning head should be able to move vertically during operation, for example to accommodate floor irregularities like thresholds, vents, or moving from a vinyl floor to carpet. The illustrated four-bar linkage provides a simple mechanism to support the cleaning head within the frame and allow the cleaning head to move relative to the frame so that the cleaning head can adjust vertically during operation of the robotic vacuum without pivoting in a manner that will cause the cleaning head to lose its parallel position with respect to the floor. As shown, in the illustrated exemplary embodiment, both the top and bottom links can be snap fit to the cleaning head assembly. The top link connects the frame to the outer portion of the impeller housing. The bottom link also connects the frame to the outer portion of the impeller housing. The frame is intended to remain fixed relative to the robotic vacuum chassis as the cleaning head components illustrated herein move relative to the frame and the chassis. As shown in the illustrated exemplary embodiment, the frame can be cutaway to allow full visual and physical access to linkages.

The frame is intended to remain fixed relative to the robotic vacuum chassis as the cleaning head components illustrated herein move relative to the frame and the chassis.

In certain embodiments, the linkage lifts at a variable rate (the front wheel lifting at a faster rate than the rearward wheel) such that maximum lift angle from resting state is less than 10°. In one embodiment, the linkage is a four bar linkage symmetrically placed about the cleaning assembly such that the forward end of each bar linkage attaches adjacent a forward edge of the cleaning assembly.

In another implementation an autonomous coverage robot has a chassis having forward and rearward portions. A drive system is mounted to the chassis and configured to maneuver the robot over a cleaning surface. A cleaning assembly is mounted on the forward portion of the chassis and at has two counter rotating rollers mounted therein for retrieving debris from the cleaning surface, the longitudinal axis of the forward roller lying in a first horizontal plane positioned above a second horizontal plane on which the longitudinal axis of the rearward roller lies. The cleaning assembly is movably mounted to the chassis by a linkage affixed at a forward end to the chassis and at a rearward end to the cleaning assembly. When the robot transitions from a firm surface to a compressible surface, the linkage lifts the cleaning assembly from the cleaning surface. The linkage lifts the cleaning assembly substantially parallel to the cleaning surface but such that the front roller lifts at a faster rate than the rearward roller.

In certain embodiments of the present teachings, the central plenum comprises a substantially horizontal elastomeric portion leading into the collection volume. The substantially horizontal elastomeric portion flexes to create a downward slope when the linkage lifts the cleaning assembly to accommodate height differentials in cleaning surfaces. In one embodiment, the substantially horizontal elastomeric portion flexes in a vertical dimension at least 5 mm such that debris lifted from the cleaning surface by the rollers travels up into the plenum and is directed down into the enclosed dust bin.

Figure 28A:
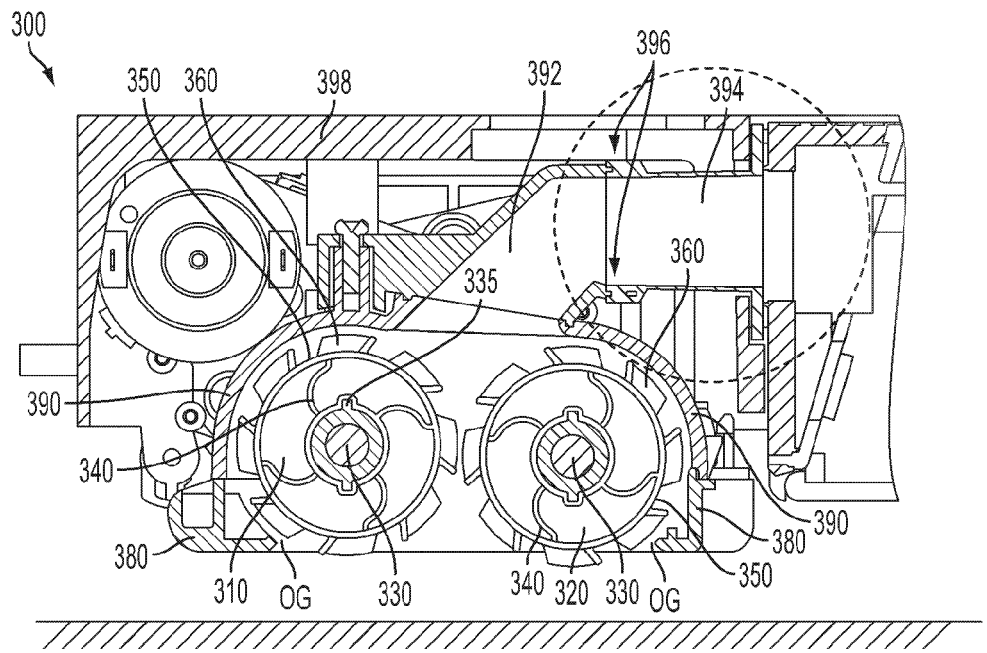
FIGS. 28A and 28B show section views of an example cleaning robot.
Figure 28B:
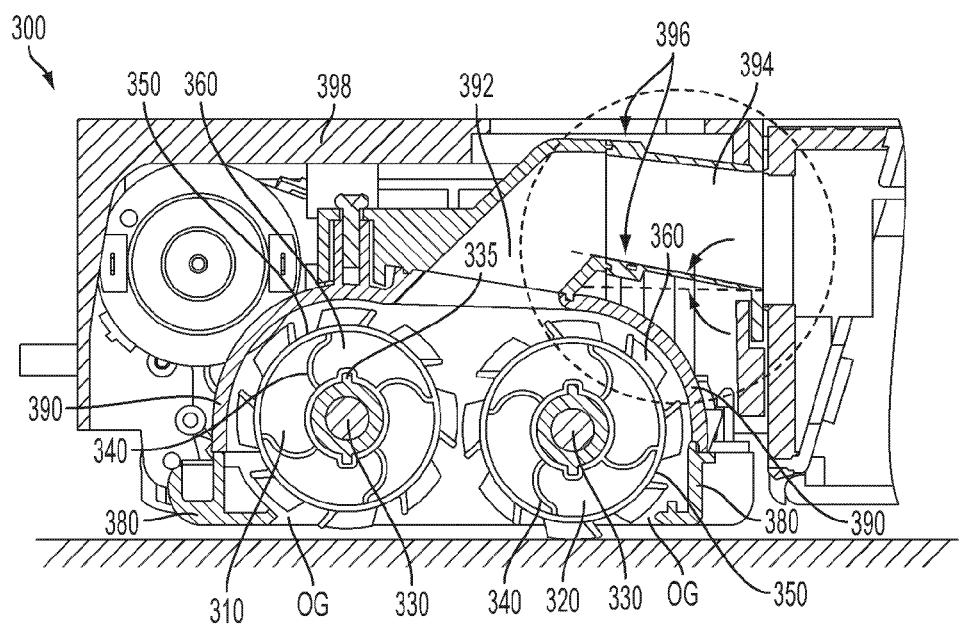

FIGS. 28A and 28B illustrate flexure of the central plenum 394 to create a downward slope as the linkage lifts the cleaning assembly when the robotic vacuum is placed on a cleaning surface, for example prior to or during operation of the robotic vacuum.

The front portion and rear portion of the vacuum airway may be formed as a unitary, monolithic component, but in some embodiments the rear portion is an elastomeric member adjoined to a rigid front portion at sealed joint. In one embodiment, the sealed joined is a compression fit wherein the rigid front portion is inserted into an elastomeric rear portion and affixed by radial compression forces. In another embodiment the sealed joint is an elastomeric overmold. The sealed joint forms a sealed vacuum path that prevents vacuum loses. In embodiments, the rear portion terminates in a flange abutting an opening to the debris collection bin in a sealed configuration. The vacuum airway therefore enables a smooth, sealed vacuum airflow.

In one embodiment, the elastomeric rear portion is manufactured from a thermoplastic material such as Mediprene™ or a thermoplastic vulcanizate (TPV) such as Santoprene™. In one embodiment, the rigid from portion is manufactured from a plastic material such as acrylonitrile butadiene styrene (ABS) or Nylon, which materials have anti-static properties and resist the accumulation of hair.

Figure 29:
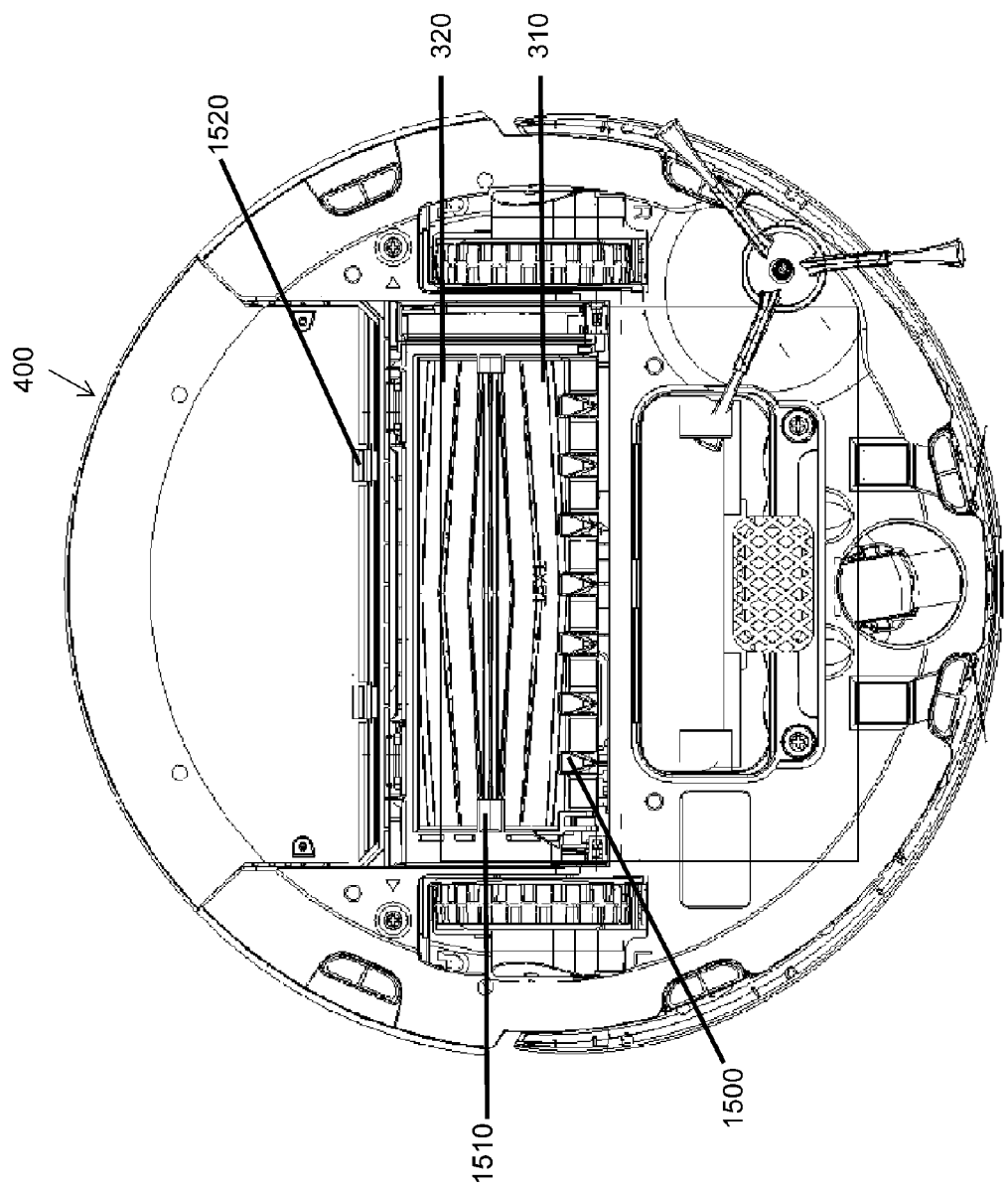
FIG. 29 is a bottom view of an example cleaning robot.

FIG. 29 is a bottom view of an embodiment of a cleaning robot in accordance with the present teachings.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. An autonomous mobile robot for cleaning a cleaning surface comprises:
a chassis having a drive system mounted therein in communication with a control system;
a cleaning head assembly having a lower cage and mounted to the chassis;
a debris collection bin mounted to the chassis;
a vacuum airway having a vacuum inlet and an airway outlet positioned adjacent the debris collection bin, and configured to deliver debris from the cleaning head assembly to the debris collection bin, the vacuum airway extending between the cleaning assembly and the debris collection bin and being in fluid communication with an impeller disposed within the debris collection bin; and
a cleaning head module connected to the chassis and having a front roller including a front shape-changing resilient tube and an adjacent rear roller including a rear shape-changing resilient tube rotatably opposing therewith beneath the vacuum inlet,
wherein a surface of the front shape-changing tube and a surface rear shape-changing tube are separated by a narrowest air gap of less than 1 cm, such that the vacuum draw directed from the vacuum airway is concentrated within the narrowest air gap.

2. The autonomous mobile robot of claim 1, wherein upon the introduction of debris larger than the narrowest air gap, one or more of the shape-changing tubes changes from circular cross-section to partially bent in cross section to permit the debris to roll between the front and rear shape-changing tubes.

3. The autonomous mobile robot of claim 1, wherein a longitudinal axis of the front roller lies in a first horizontal plane positioned above a second horizontal plane on which a longitudinal axis of the rear roller lies, and
wherein at least a portion of the rear roller extends beneath the lower cage of the cleaning head assembly to make contact with the cleaning surface.

4. The autonomous mobile robot of claim 1, wherein the narrowest air gap has a width of between about 1 mm to about 2 mm.

5. The autonomous mobile robot of claim 1, wherein a cross sectional area of the narrowest air gap between the front roller and the rear roller is substantially equal to or less than a cross sectional area of the vacuum inlet.

6. The autonomous mobile robot of claim 1, wherein a ratio of the area of the narrowest air gap to an area of a planar cross section taken across the vacuum inlet is between about 1:1 to 10:1.

7. The autonomous mobile robot of claim 1, wherein a ratio of the area of the narrowest air gap to an area of a planar cross section taken across the vacuum inlet is about 4:1.

8. The autonomous mobile robot of claim 1, wherein, during operation of the autonomous mobile robot, a lower surface of the lower cage is spaced above the cleaning surface a distance less than or equal to about 1 mm.

9. The autonomous mobile robot of claim 1, wherein the vacuum airway has a substantially constant non-angular cross section from the vacuum inlet to the airway outlet.

10. The autonomous mobile robot of claim 1, wherein the front roller and the rear roller are in parallel longitudinal alignment with the vacuum inlet, and each of the front roller and the rear roller has at least one vane extending outwardly from an outer surface thereof.

11. The autonomous mobile robot of claim 10, wherein the at least one vane extends from the outer surface of the roller by a height that is at least 10% of a diameter of the respective roller and the at least one vane on the front roller is spaced apart from the at least one vane on the rear roller by a distance of about 1 mm.

12. The autonomous mobile robot of claim 11, wherein each of the at least one vanes comprises a V-shaped chevron having a point.

13. The autonomous mobile robot of claim 12, wherein the point of the V-shaped chevron is located directly in line with a center of the vacuum inlet.

14. An autonomous mobile robot for cleaning a cleaning surface comprises:
a chassis having a drive system mounted therein in communication with a control system;
a cleaning head assembly having a lower cage and mounted to the chassis;
a debris collection bin mounted to the chassis;
a vacuum airway having a vacuum inlet and an airway outlet, and configured to deliver debris from the cleaning head assembly to the debris collection bin, the vacuum airway extending between the cleaning assembly and the debris collection bin;
a cleaning head module connected to the chassis and having a rotatably engaged front roller comprising a front shape-changing resilient tube positioned adjacent to a rotatably engaged rear roller including a rear shape-changing resilient tube, the front roller and rear roller being located beneath the vacuum inlet to the vacuum airway; and
a cleaning head module connected to the chassis and having a front roller including a front shape-changing resilient tube integrally molded with a plurality of longitudinal vanes distributed about the circumference thereof, and an adjacent rear roller including a rear shape-changing resilient tube integrally molded with a plurality of longitudinal vanes distributed about the circumference thereof, rotatably opposing therewith beneath the vacuum inlet,
wherein the longitudinal vanes are each less than ⅔ of a narrowest air gap between the front shape-changing resilient tube and the rear shape changing resilient tube, so that the longitudinal vanes agitate and direct debris from a cleaning surface location directly beneath the narrowest air gap to the narrowest air gap.

15. The autonomous mobile robot of claim 14, wherein upon the introduction of debris larger than the narrowest air gap, one or more of the shape-changing resilient tubes integrally molded with a plurality of longitudinal vanes distributed, about the circumference thereof, changes from circular cross-section to partially bent in and/or off-center to permit the debris to roll between the front and rear resilient shape-changing tube.

16. The autonomous mobile robot of claim 14, wherein a longitudinal axis of the front roller lies in a first horizontal plane positioned above a second horizontal plane on which a longitudinal axis of the rear roller lies, and wherein the rear roller extends beneath the lower cage to make contact with the cleaning surface.

17. The autonomous mobile robot of claim 14, wherein the closest approach of the opposing longitudinal vanes is between about 1 mm and about 2 mm.

18. The autonomous mobile robot of claim 14, wherein the cleaning head module envelopes between about 125° and about 175° of an outer circumference of each of the front roller and the rear roller, and the cleaning head module is spaced from a radially outermost part of the front member and the rear member by less than or equal to about 1 mm.

19. The autonomous mobile robot of claim 18, wherein the cleaning head module envelopes about 150° of an outer circumference of each of the front roller and the rear roller.

20. The autonomous mobile robot of claim 14, wherein, during operation of the autonomous mobile robot, a lower surface of the lower cage is spaced above the cleaning surface a distance less than or equal to about 1 mm.

21. The autonomous mobile robot of claim 14, wherein a cross sectional area of the air gap between the front roller and the rear roller is substantially equal to or less than a cross sectional area of the vacuum inlet.

22. The autonomous mobile robot of claim 14, wherein a ratio of the area of the air gap to an area of a planar cross section taken across the vacuum inlet is between about 1:1 to 10:1.

23. The autonomous mobile robot of claim 14, wherein a ratio of the area of the air gap to an area of a planar cross section taken across the vacuum inlet is about 4:1.

24. The autonomous mobile robot of claim 14, wherein the at least one longitudinal vane extends from the outer surface of the roller by a height that is at least 10% of a diameter of the respective roller and the at least one longitudinal vane on the front roller is spaced apart from the at least one longitudinal vane on the rear roller by a distance of about 1 mm.

25. The resilient compressible roller of claim 24, wherein the at least one longitudinal vane defines a V-shaped chevron, the chevron having a central tip, a first leg extending from the central tip to a first end of the outer roller surface and a second leg extending from the central tip to a second end of the outer roller surface.

26. The resilient compressible roller of claim 25, wherein the legs of the V-shaped chevron are at about a 5° to 10° angle θ relative to a linear longitudinal path traced on a surface of the roller and extending from the first end of the roller to the second end of the roller.

27. The autonomous mobile robot of claim 25, wherein the point of the V-shaped chevron is located directly in line with a center of the vacuum inlet.

28. The autonomous mobile robot of claim 1, wherein the cleaning head module envelopes between about 125° and about 175° of an outer circumference of each of the front roller and the rear roller, and the cleaning head module is spaced from a radially outermost part of the front member and the rear member by less than or equal to about 1 mm.

29. The autonomous mobile robot of claim 28, wherein the cleaning head module envelopes about 150° of an outer circumference of each of the front roller and the rear roller.

30. An autonomous mobile robot for cleaning a cleaning surface comprises:
a chassis having a drive system mounted therein in communication with a control system;
a cleaning head assembly having a lower cage and mounted to the chassis;
a debris collection bin mounted to the chassis;
a vacuum airway having a vacuum inlet and an airway outlet positioned adjacent the debris collection bin, and configured to deliver debris from the cleaning head assembly to the debris collection bin, the vacuum airway extending between the cleaning head assembly and the debris collection bin and being in fluid communication with an impeller disposed within the debris collection bin; and
a cleaning head module connected to the chassis and having a front roller including a front shape-changing resilient tube and an adjacent rear roller including a rear shape-changing resilient tube rotatably opposing therewith beneath the vacuum inlet,
wherein a surface of the front shape-changing-tube and a surface rear shape-changing tube are separated by a narrowest air gap such that the vacuum draw directed from the vacuum airway is concentrated within the narrowest air gap,
wherein a cross sectional area of the narrowest air gap between the front roller and the rear roller is substantially equal to or less than a cross sectional area of the vacuum inlet such that the air flow within the narrowest air gap is substantially equal to or greater than the air flow in the airway, and
wherein the airway includes a deflecting slope above the narrowest air gap that redirects debris along the vacuum airway toward the debris collection bin.

31. The autonomous mobile robot of claim 30, wherein the longitudinal axis of the front portion of the vacuum airway having an angle about 45° relative to the vertical axis.

32. The autonomous mobile robot of claim 30, wherein the front portion of the vacuum airway comprises a rigid material and the rear portion of the vacuum airway comprises an elastomeric member adjoined to a rigid front portion at sealed joint.

33. The autonomous mobile robot of claim 32, wherein the cleaning head assembly is movably mounted to the chassis by a linkage having a forward end and a rearward end, and being affixed at the forward end to the chassis and at the rearward end to the cleaning head module, the linkage being configured to lift the cleaning head assembly from the cleaning surface.

34. The autonomous mobile robot of claim 33, wherein the elastomeric member is downstream from the deflecting slope and has a downward slope when the autonomous mobile robot is place in an operating position on the cleaning surface.

35. The autonomous mobile robot of claim 33, wherein the sealed joint is an elastomeric overmold.

36. The autonomous mobile robot of claim 30, wherein the front roller and the rear roller are in parallel longitudinal alignment with the vacuum inlet, and each of the front roller and the rear roller has at least one vane extending outwardly from an outer surface thereof.

37. The autonomous mobile robot of claim 14, wherein the front roller and the rear roller are in parallel longitudinal alignment with the vacuum inlet, and each of the front roller and the rear roller has at least one vane extending outwardly from an outer surface thereof.

* * * * *